United States Patent
Hernandez-Cubero et al.

(10) Patent No.: US 10,394,010 B2
(45) Date of Patent: Aug. 27, 2019

(54) OPTICAL SYSTEM FOR SHAPING THE WAVEFRONT OF THE ELECTRIC FIELD OF AN INPUT LIGHT BEAM

(71) Applicants: UNIVERSITE PARIS DESCARTES, Paris (FR); INSTITUT NATIONAL DE LA SANTE ET DE LA RECHERCHE MEDICALE (INSERM), Paris (FR); CENTRE NATIONAL DE LA RECHERCHE SCIENTIFIQUE (CNRS), Paris (FR)

(72) Inventors: Oscar Hernandez-Cubero, Paris (FR); Eirini Papagiakoumou, Antony (FR); Emiliani Valentina, Paris (FR)

(73) Assignees: UNIVERSITE PARIS DESCARTES, Paris (FR); INSTITUT NATIONAL DE LA SANTE ET DE LA RECHERCHE MEDICALE(INSERM), Paris (FR); CENTRE NATIONAL DE LA RECHERCHE SCIENTIFIQUE (CNRS), Paris (FR)

(*) Notice: Subject to any disclaimer, the term of this patent is extended or adjusted under 35 U.S.C. 154(b) by 72 days.

(21) Appl. No.: 15/557,889

(22) PCT Filed: Jan. 22, 2016

(86) PCT No.: PCT/EP2016/051394
§ 371 (c)(1),
(2) Date: Sep. 13, 2017

(87) PCT Pub. No.: WO2016/146279
PCT Pub. Date: Sep. 22, 2016

(65) Prior Publication Data
US 2018/0074304 A1 Mar. 15, 2018

(30) Foreign Application Priority Data

Mar. 13, 2015 (EP) .................................. 15020033
May 22, 2015 (EP) .................................. 15305782

(51) Int. Cl.
*G03H 1/12* (2006.01)
*G02B 21/00* (2006.01)
(Continued)

(52) U.S. Cl.
CPC ..... *G02B 21/0076* (2013.01); *G02B 21/0032* (2013.01); *G02B 21/06* (2013.01);
(Continued)

(58) Field of Classification Search
CPC ...... G02B 5/32; G02B 21/00; G02B 21/0004; G02B 21/002; G02B 21/36; G02B 21/361;
(Continued)

(56) References Cited

U.S. PATENT DOCUMENTS 4,786,124 A * 11/1988 Stone .................. G01D 5/38
                                                                     359/15
8,300,669 B2 * 10/2012 Dantus ................ G01J 11/00
                                                                     250/458.1
(Continued)

FOREIGN PATENT DOCUMENTS

WO      2014152984 A1     9/2014

OTHER PUBLICATIONS

International Search Report issued in connection with PCT/EP2016/051394 dated Jan. 7, 2016.
(Continued)

*Primary Examiner* — Arnel C Lavarias
(74) *Attorney, Agent, or Firm* — Steven M. Shape; Dennemeyer & Associates, LLC

(57) ABSTRACT

An optical system for shaping a wavefront of an electric field of an input light beam to be projected into a target volume including a first optical element, a spatial light modulator used to control light distribution in at least one transverse plane in the target volume. An intermediate optical element located on an optical axis, after the first optical element on a trajectory of the light beam for modulating the phase or the amplitude of the electric field of the input light beam is included. A second optical element for modulating the phase or the amplitude of the electric field of the input light beam is used to control the axial position of the transverse plane in the target volume. The second optical element is situated on the optical axis after the at least one intermediate optical element on the trajectory of the light beam.

9 Claims, 15 Drawing Sheets

Figure 1A:
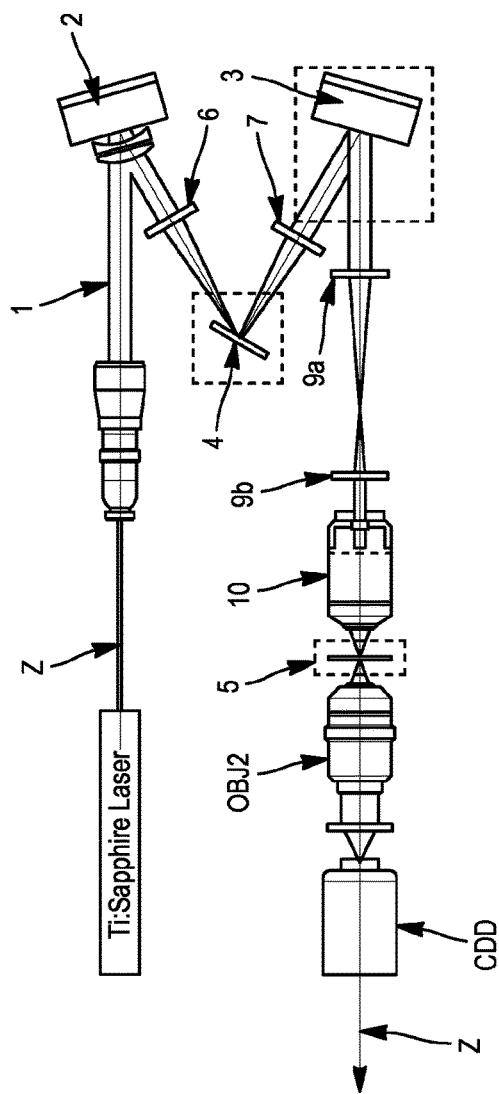

(51) Int. Cl.
    *G02B 21/06*     (2006.01)
    *G02B 26/00*     (2006.01)
    *G02B 27/09*     (2006.01)
    *G02B 26/06*     (2006.01)

(52) U.S. Cl.
    CPC ............. *G02B 26/00* (2013.01); *G02B 26/06* (2013.01); *G02B 27/09* (2013.01); *G02B 27/0944* (2013.01)

(58) Field of Classification Search
    CPC ..... G03H 2001/0005; G03H 2001/005; G03H 1/0443; G03H 2001/045; G03H 2001/0452; G03H 2001/0454; G03H 2001/0458; G03H 1/08; G03H 1/0866; G03H 2001/0883; G03H 1/16
    USPC .... 359/1, 9, 15, 19, 21, 29, 32, 33, 35, 362, 359/363, 368, 369, 434, 435
    See application file for complete search history.

(56) References Cited

U.S. PATENT DOCUMENTS 9,778,573 B2 * 10/2017 Tang ...................... G02B 21/06
2015/0010029 A1    1/2015 Lindinger
2016/0231575 A1 * 8/2016 Shoham ............ G02B 27/0905

OTHER PUBLICATIONS

Matthew A. Coughlan et al, "Parametric Spatio-Temporal Control of Focusing Laser Pulses," Optics Express, vol. 17, No. 18, Aug. 21, 2009, p. 15808.

* cited by examiner

STATE OF THE ART

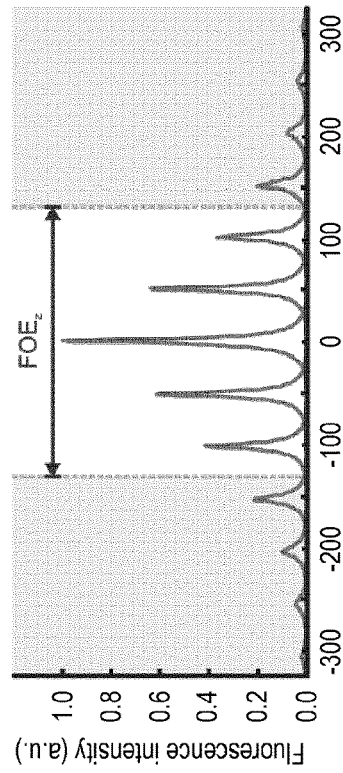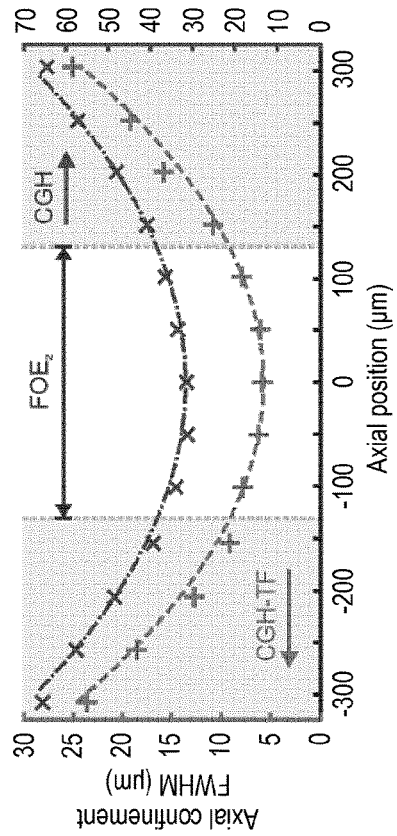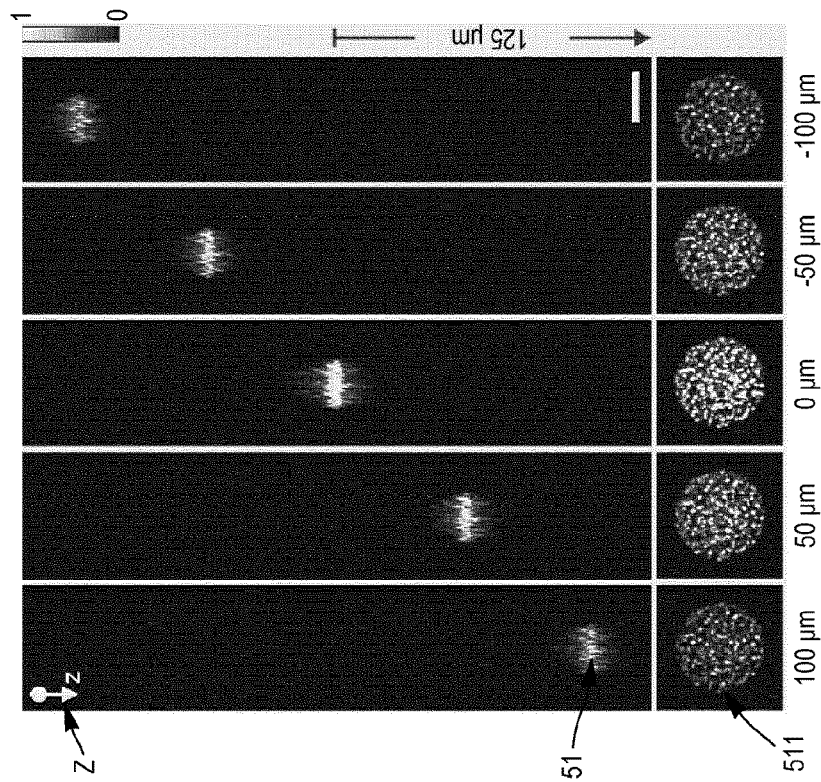
FIG. 2a
FIG. 2b
FIG. 2c

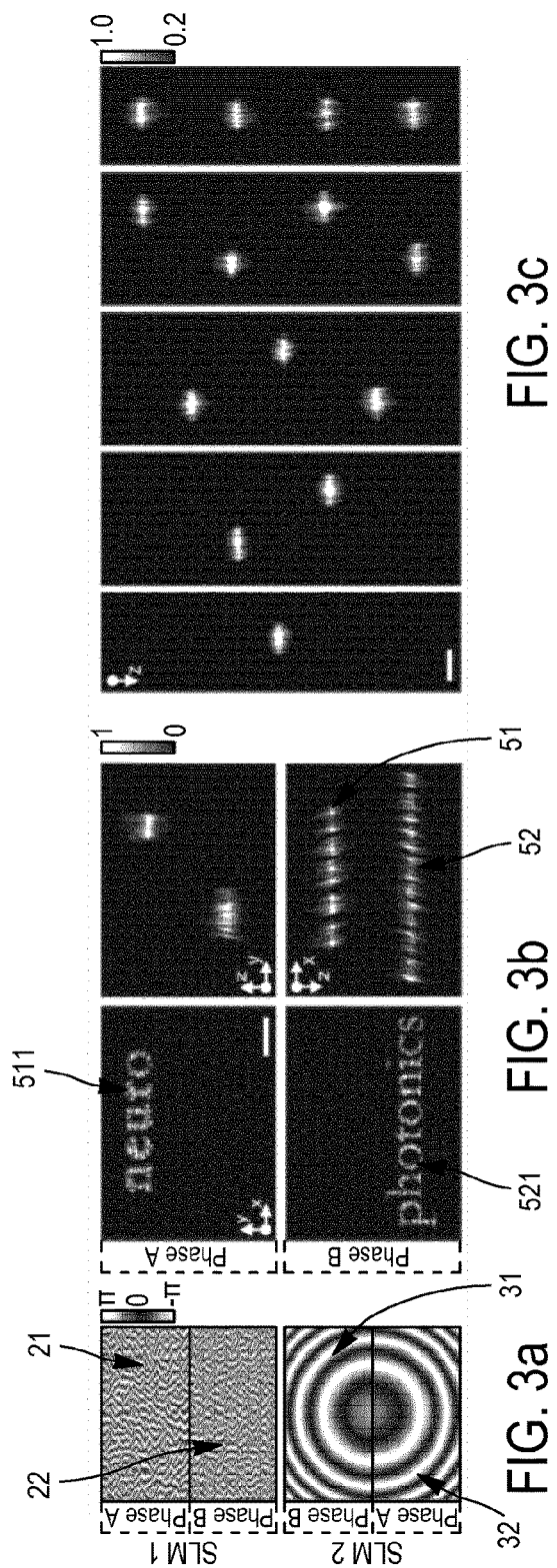
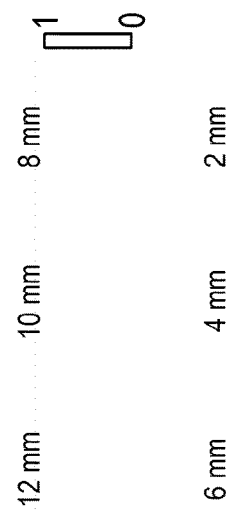
FIG. 3a
FIG. 3b
FIG. 3c
FIG. 3e

STATE OF THE ART

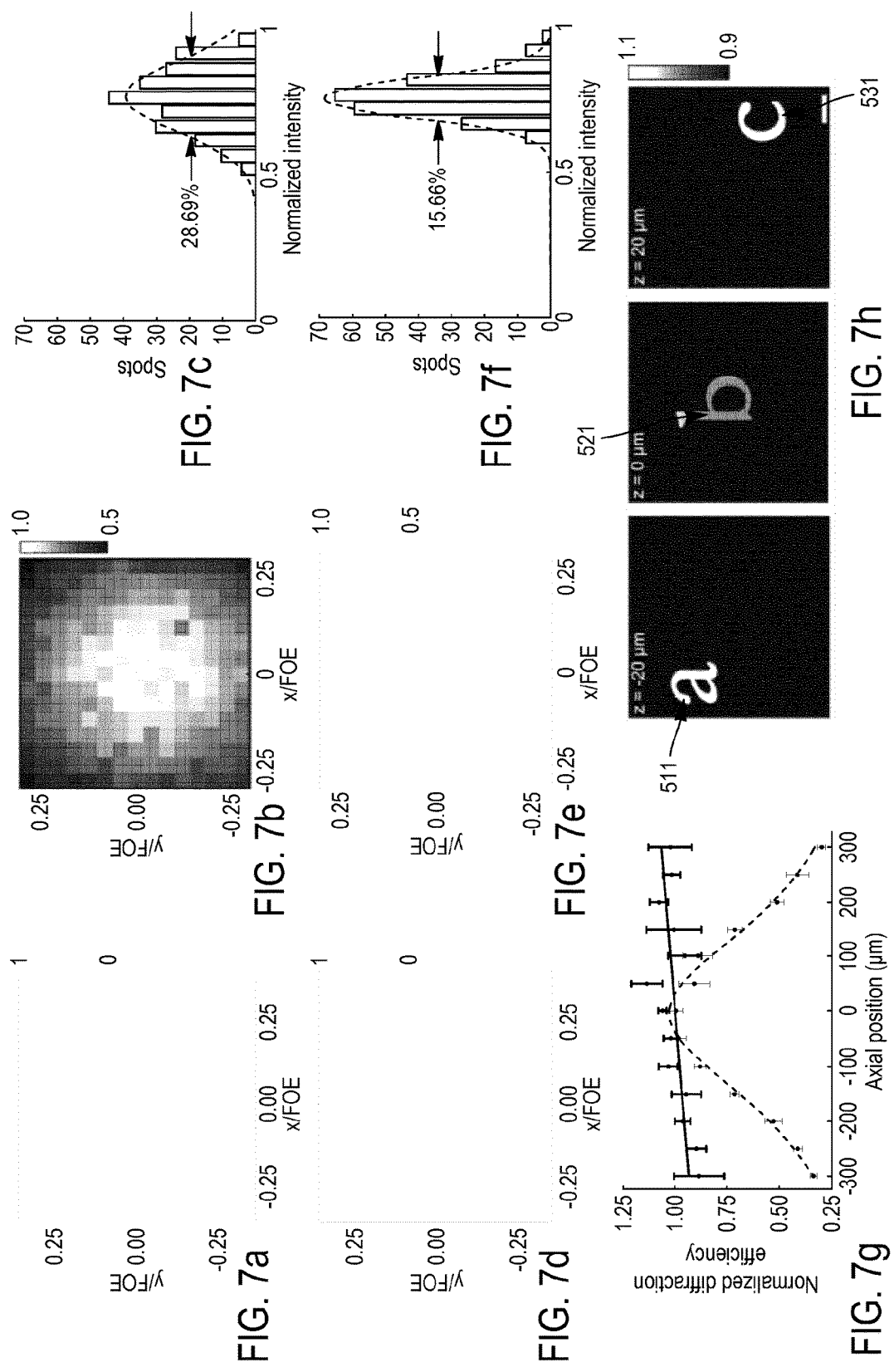

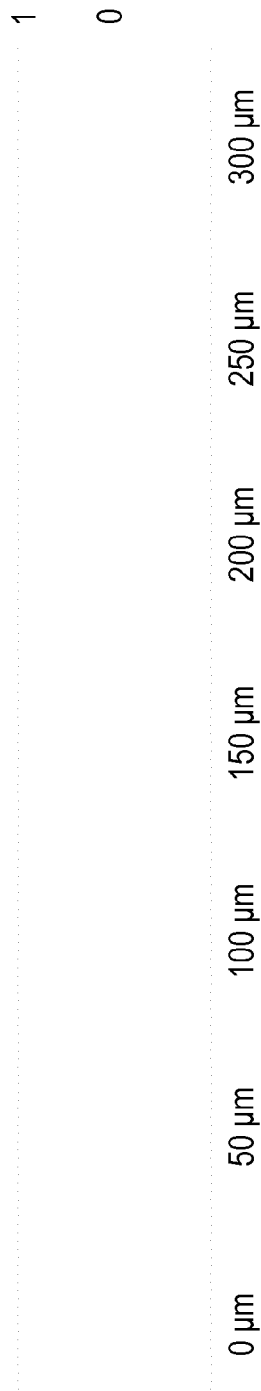

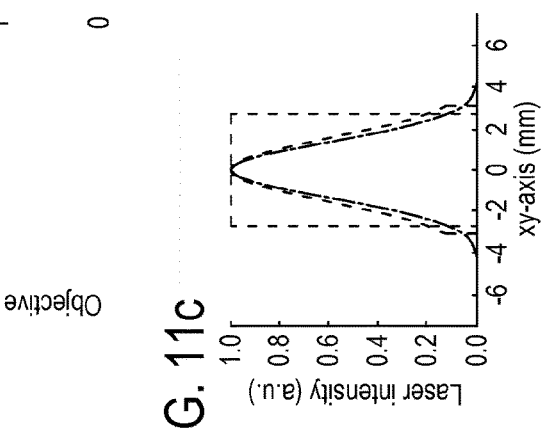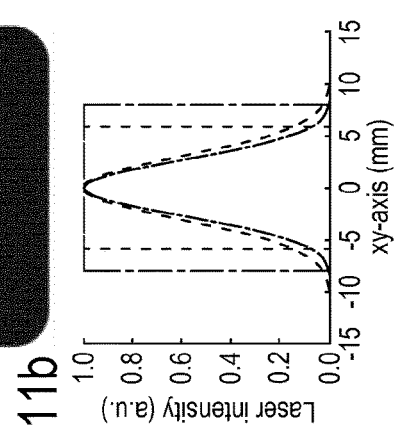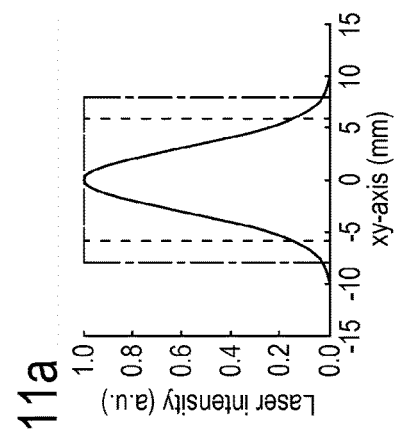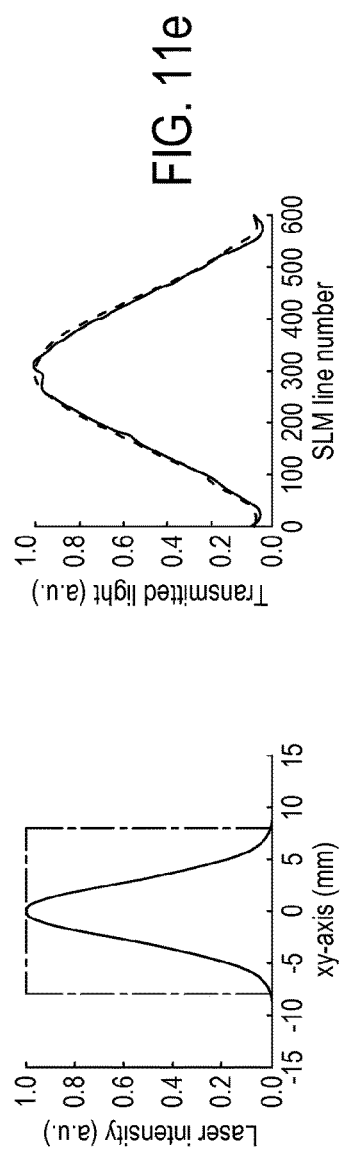
FIG. 11a
FIG. 11b
FIG. 11c
FIG. 11d
FIG. 11e

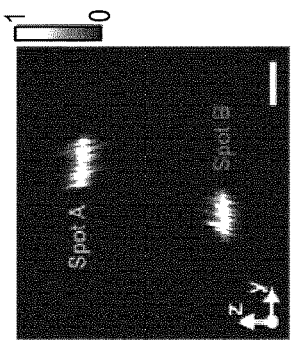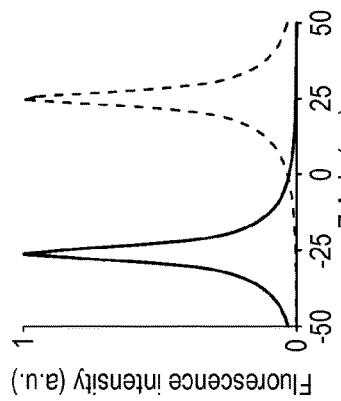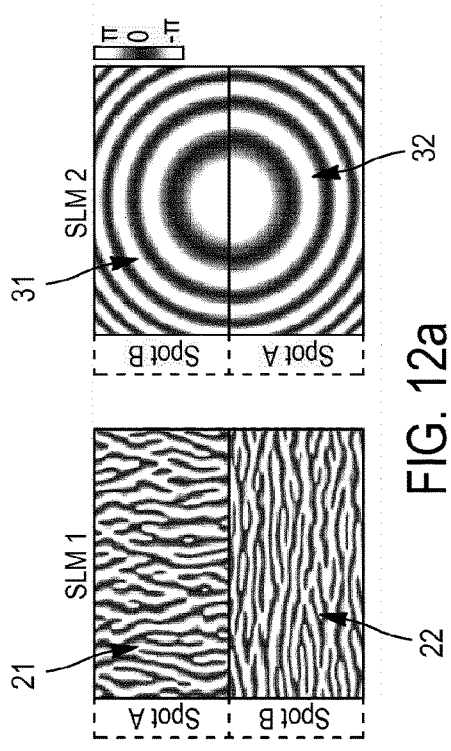
FIG. 12a FIG. 12c FIG. 12e
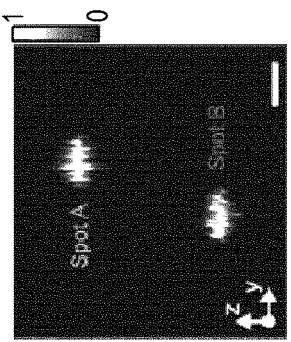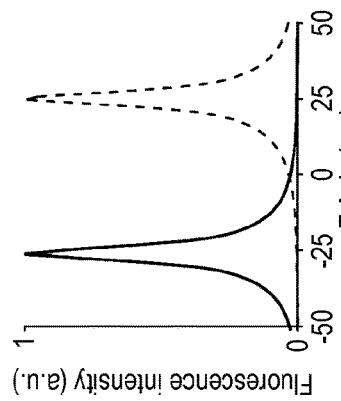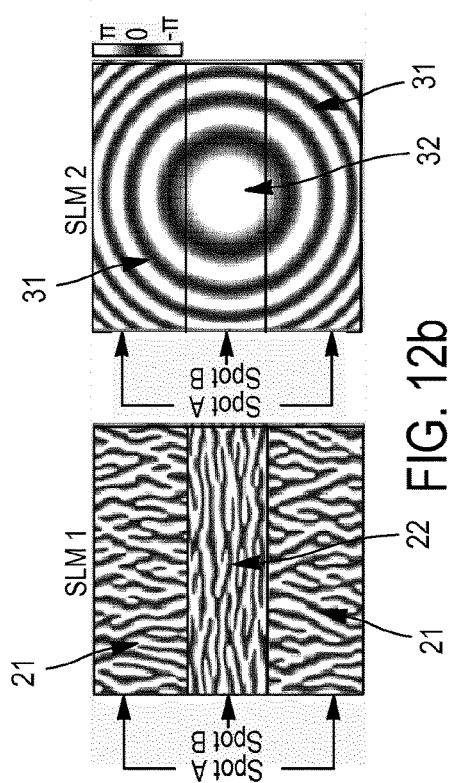
FIG. 12b FIG. 12d FIG. 12f

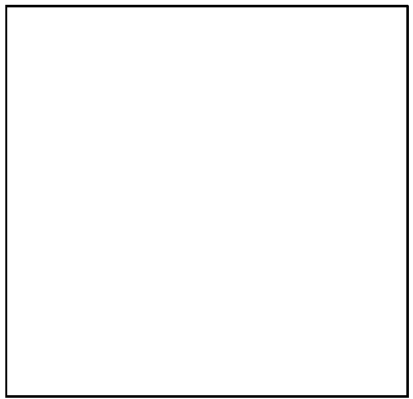
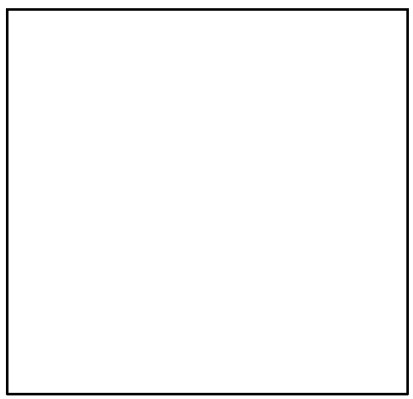
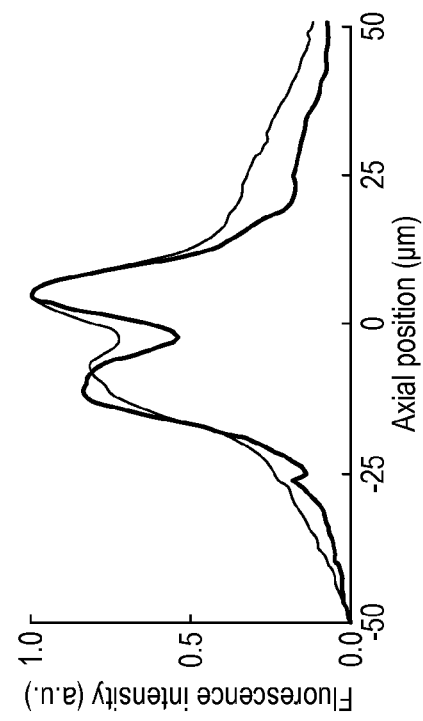
FIG. 14a
FIG. 14b

OPTICAL SYSTEM FOR SHAPING THE WAVEFRONT OF THE ELECTRIC FIELD OF AN INPUT LIGHT BEAM

FIELD OF THE INVENTION

The invention concerns spatial wavefront shaping.

STATE OF ART

Wavefront shaping starts having a strong impact in many diverse research fields of microscopy including structural and functional imaging, neuronal photostimulation and lithography.

Previous systems suggesting temporal modulation of a laser beam with pulse shapers using a SLM between two gratings, and then spatial modulation with another SLM, and which is described for instance in the US Patent US20150010029. In those systems the first SLM of the pulse shaper performs modulation of the spectral phase of the laser beam, thus modulating the temporal profile (pulse duration) of the beam, and the second SLM performs spatial phase modulation of the laser beam wavefront, modulating the intensity distribution of light. A pulse shaper of the state of art uses two gratings, one to disperse the spectral components and one to recombine them to form again the laser pulse, after modulation of its temporal profile on the SLM. Thus, the output beam from a pulse shaper has a specific pulse duration that does not change with propagation of the beam.

Original configurations for 2P microscopy were based on laser scanning approaches, where a tightly focused pulsed beam is scanned across a defined sample region with the use of galvanometric mirrors or acousto-optical deflectors (AODs). Today, the need of monitoring large volumes with high spatiotemporal resolution has prompted the developments of new optical schemes. These include random access scanning with AODs, fast scanning with resonant scanners or spatiotemporal beam multiplexing. These configurations coupled to fast axial scanning enable quick probing of large three-dimensional (3D) volumes.

Few years ago, temporal focusing (TF) was proposed as an elegant scan-less solution to simultaneously illuminate large areas with micrometer axial confinement. In this configuration, a dispersive grating placed at a plane conjugated with the sample plane, diffracts the different spectral frequencies comprising the ultra-short excitation pulse toward different directions. The various frequencies thus propagate toward the objective focal plane at different angles, such that the pulse is temporally smeared away from the focal plane, which remains the only region irradiated at peak powers efficient for 2P excitation. TF has found applications in imaging, super resolution imaging, lithography and, combined with scanning approaches, has permitted efficient optogenetic photostimulation in vitro and in vivo.

Many applications, such as lithography, uncaging, optogenetics or fast functional imaging, require generation of 2P illumination patterns on user-defined regions of interest. This was achieved by combining TF with spatial wavefront-shaping approaches such as computer-generated holography (CGH) or generalized phase contrast. In both cases, illumination shapes (=targets=patterns) based on the sample morphology were generated with micrometer axial and lateral precision, remarkable robustness to scattering that enabled efficient neuronal stimulation with 2P optogenetics.

The next challenging breakthrough for 2P microscopy is to enable generation of shaped illumination targets across 3D volumes while preserving micrometer lateral and axial precision.

3D light shaping is possible using 3D CGH. This approach has been largely exploited to generate multi-diffraction-limited traps for optical tweezers and for 3D glutamate uncaging, however only few demonstrations of 3D generation of laterally extended shapes exist and those using high numerical aperture (NA) objectives only proved light generation across a few micrometer axial range. Moreover, current 3D CGH optical designs cannot be implemented with a conventional scheme for TF because the different excitation planes cannot be simultaneously imaged onto the TF grating and therefore cannot be all temporally focussed. Therefore, due to the linear proportionality between lateral shape area and axial extent, axial confinement will quickly deteriorate for cases demanding illumination of multiple targets closely distributed or of extended area.

Figure 1B:
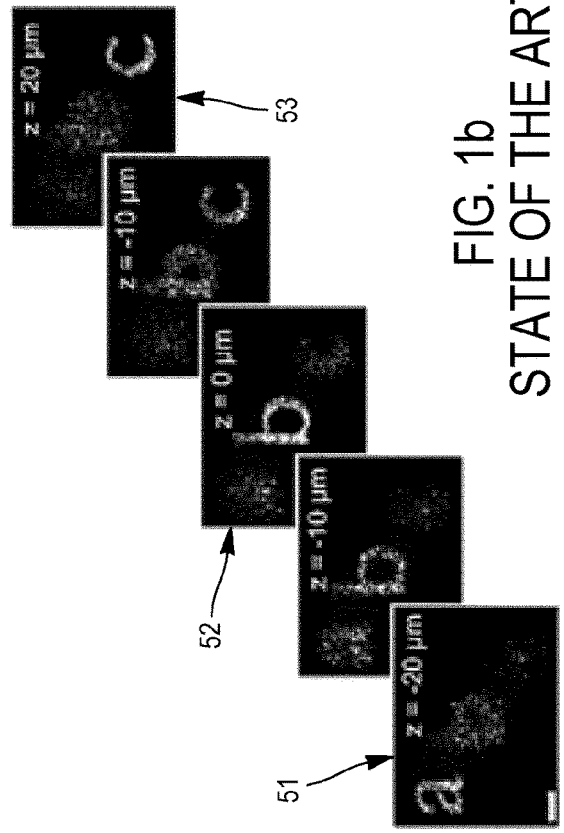

FIG. 1b: Two-photon fluorescence images of 3D CGH patterns of the state of the art, depicting the letters 'a', 'b' and 'c' projected in three planes (51,52,53) at three different axial positions, $z=-20$ µm, 0 and 20 µm respectively. For 3D CGH of state of the art some mirrors are used. The phase profile used to project those patterns was calculated using a 3D Gerchberg and Saxton (GS) algorithm (described in FIG. 6). Weighting of the input patterns (FIG. 7a, 7b, 7c, 7d, 7e, 7f, 7g, 7h) enabled diffraction efficiency correction and permitted equal intensity light patterns.

We can see on FIG. 1b that the letter b (and also the letters a, c to a lesser extent) is not only at $z=0$ µm but also at $z=10$, 20, $-10$, $-20$ µm, which degrades the quality of the image.

SUMMARY OF THE INVENTION

Here, the invention presents an optical scheme for non-mechanical remote axial displacement and/or remote axial scanning of spatiotemporal focused patterns and 3D CGH-TF for spatiotemporal focused pattern generation in large volumes, which minimizes optical aberrations and includes accurate compensation protocols to ensure uniform light distribution across the entire accessible volume. The present invention can be also used for non-mechanical remote axial displacement and/or remote axial scanning of fast modulated three-dimensional patterns.

The optical system for shaping the wavefront of the electric field of a light beam to be projected into a target volume, includes:
  a first optical element which is a spatial light modulator used to control light distribution, through phase and/or amplitude modulation of the electric field of the input light beam, in at least one transverse plane in the target volume in regard to an optical axis (z),
  at least one intermediate optical element being located, on the optical axis (z), after the first optical element on a trajectory of the light beam, for modulating the phase and/or the amplitude of the electric field of the light beam, and
  a second optical element for modulating the phase and/or the amplitude of the electric field of the light beam and used to control the axial position of the at least one transverse plane in the target volume along the optical axis (z), the second optical element being situated on the optical axis (z) after the at least one intermediate optical element on the trajectory of the light beam.

In one embodiment, the optical system is used to generate a 3D holographic pattern composed of a plurality of 2D holographic patterns focused into the target volume onto different transverse planes which are positioned on different positions on the optical axis, each 2D holographic pattern corresponds to a different transverse plane, wherein the first spatial light modulator is divided in a number of first independent regions equivalent to the number of transverse planes, each of these first independent regions is used to generate a 2D holographic pattern focused onto the at least one intermediate optical element, wherein the second optical element is a spatial light modulator divided in a number of second independent regions equal to the number of first independent regions, each second independent region controlling the axial position in the target volume of the corresponding 2D holographic pattern generated by the first spatial light modulator, and wherein the first independent regions and second independent regions are tiled parallel to the orientation of the dispersive grating lines.

The intermediate optical element being either a digital micromirror device (DMD) for fast amplitude modulation of the 2D illumination patterns, and/or a dispersive grating for performing temporal focusing of the light beam on the at least one transverse plane.

FIG. 1: 3D CGH-TF.

FIG. 1a: Schematic of the optical setup for 3D CGH of the invention with temporal focusing (TF). The output beam of a Ti:Sapphire laser is magnified using a beam expander (BE) and projected onto a spatial light modulator 2. This first SLM 2 modulates the beam phase so the laser intensity recreates user-designed intensity pattern on a diffraction grating 4 after passing through a first lens 6. The first diffraction order from the grating is consequently collimated by a second lens 7 and impinges on a second optical element 3, for instance, a spatial light modulator, which shifts axially both the spatial and temporal focal planes. The laser beam is then relayed and scaled by a third and fourth lens 9a, 9b to the excitation objective 10 pupil size. The objective 10 is mounted on a piezo stage so that it focuses and axially scans the excitation beam across a thin fluorescent layer 5. A second objective (OBJ2), always focused on the fluorescent layer, collects emitted fluorescence and forms an image on a CCD camera.

FIG. 2: Axial displacement of spatiotemporal focused patterns.

FIG. 2a: Axial displacement of a 20-µm-diameter holographic spot 511 by addressing Fresnel-lens phase profiles on the second SLM 3. The lateral intensity profile of the spot 511 is shown at the bottom of its corresponding axial profile, for every axial plane 51. Images show spot-quality degradation and intensity decay with increased axial shift. Scale bar: 20 µm FIG. 2b: Axial distribution of the integrated fluorescence intensity of the 20-µm-diameter holographic spot 511 for different axial displacements.

FIG. 2c: The bottom line represents axial confinement (FWHM) of the distributions shown in b with TF (experimental data marked as plus signs) and without TF (experimental data marked as crosses). Data are fitted with parabolic functions (dotted-dashed and dashed lines). White area in b and c represents the field of excitation ($FOE_z$).

FIG. 3: 3D spatiotemporally-focused pattern generation.

FIG. 3a: Tiled phase profiles addressed to the first SLM 2 for encoding the words 'neuro' (511) in plane A (21) and 'photonics' (521) in plane B (22). The second SLM is accordingly tiled to encode two holographic lenses 31, 32 that axially translated each holographic pattern onto separated planes at +20 µm (51) and −20 µm (52).

FIG. 3b: Two-photon fluorescence images at the two axial planes 51, 52 of the patterns generated 511, 521 (left) and maximum intensity projection along the z-direction (right).

FIG. 3c: Orthogonal maximum intensity projection of 20-µm-diameter holographic spots 511, 521 . . . occupying multiple distinct spatiotemporal focal planes 51, 52 . . . .

Figure 3D:
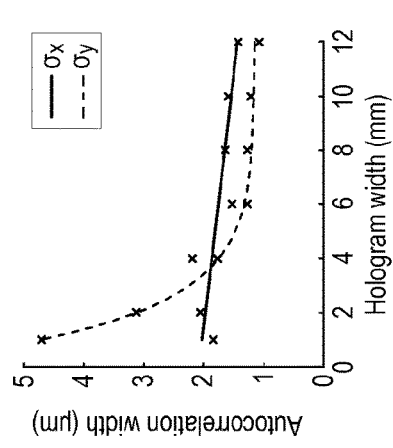

FIG. 3d: Axial confinement (FWHM) of 20-µm-diameter holographic spots for different hologram widths, tested in directions Δx (dark grey line and crosses) and Δy (light grey line and crosses) parallel and perpendicular to the grating dispersion, respectively. Reducing the hologram width Δy perpendicular to the direction of grating's dispersion does not affect the axial confinement of the spots. This is also equivalent to physically filtering the beam with a rectangular aperture in x- and y-axis.

FIG. 3e: Two-photon fluorescence images of the holographic spots for different hologram widths Δy. Important reduction of Δy significantly affects the quality of the spots increasing its speckle size in the same direction accordingly to the size of the hologram (or the beam size).

Figure 3F:
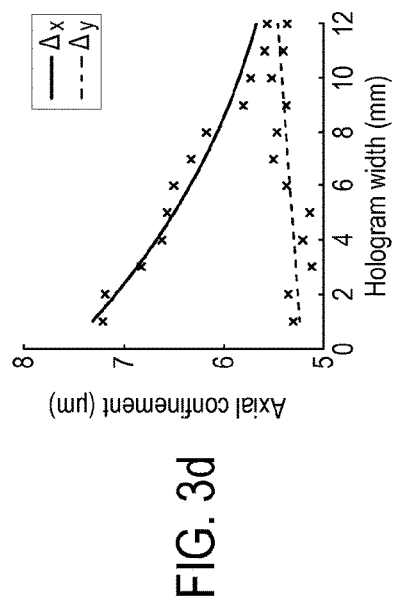

FIG. 3f: Average autocorrelation width of the speckles of a 20-µm-diameter holographic spot generated in respect to the hologram width for the x- (dark grey line and crosses; $\sigma_x$) and y-direction (light grey line and crosses; $\sigma_y$). Cropping the phase profile (i.e. addressing a smaller SLM area, or physically cropping the beam) in y-direction translates into speckle size increase.

Figure 3G:
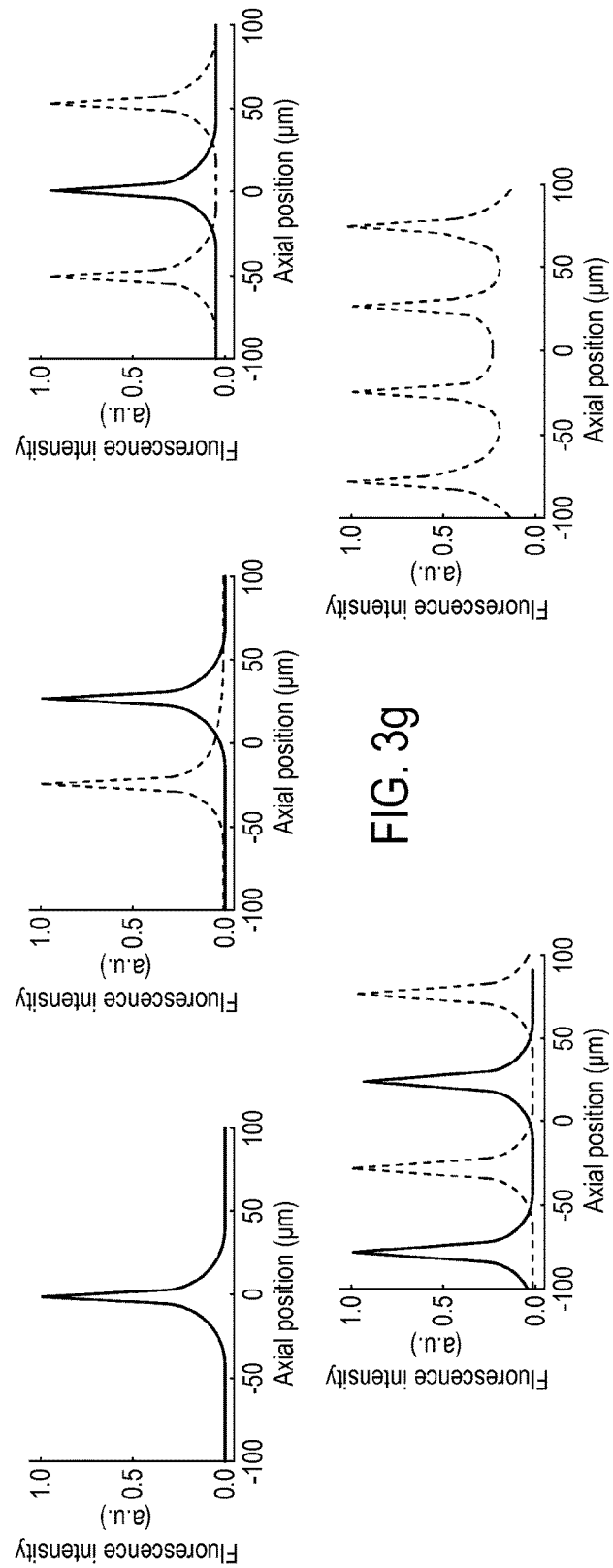

FIG. 3g: Axial integrated fluorescence intensity distribution of the holographic spots on panel c. Scale bars: 20 µm.

FIG. 4: 3D simultaneous two-photon photoconversion.

Figure 4A:
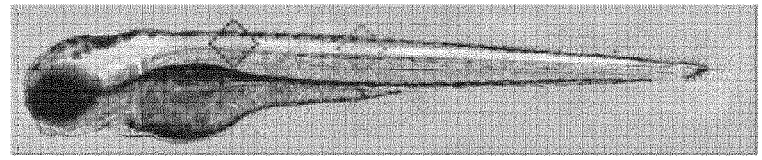

FIG. 4a: Merged brightfield and widefield fluorescence image of a Kaede-expressing zebrafish larvae (Huc line). The dark and light grey squares represent the approximate areas where we performed photoconversion.

Figure 4B:
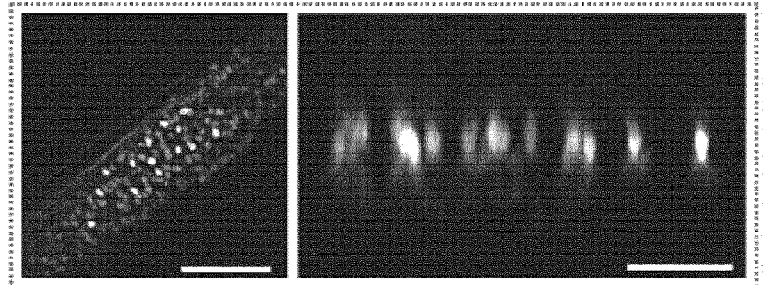

FIG. 4b: Overlaid HiLo pre- and post-photoconversion fluorescence images of zebrafish neurons (left). "Brighter" cells indicate photoconverted cells. Orthogonal maximum fluorescence intensity projection (right) after photoconversion shows single-cell axial resolution. Fourteen neurons on a single axial plane were photoconverted (illumination with 0.40 mW/µm², 200 pulses of 50 ms) with high lateral and axial selectivity.

Figure 4C:
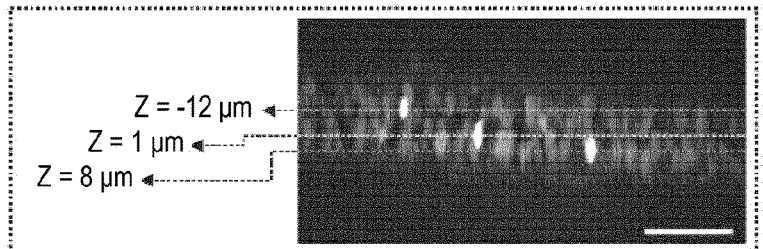

FIG. 4c: Orthogonal maximum fluorescence intensity projection of overlaid HiLo pre- and post-photoconversion images, where three single cells were photoconverted on separated axial planes (4.02 mW/µm², 1 pulse of 200 ms).

Figure 4D:
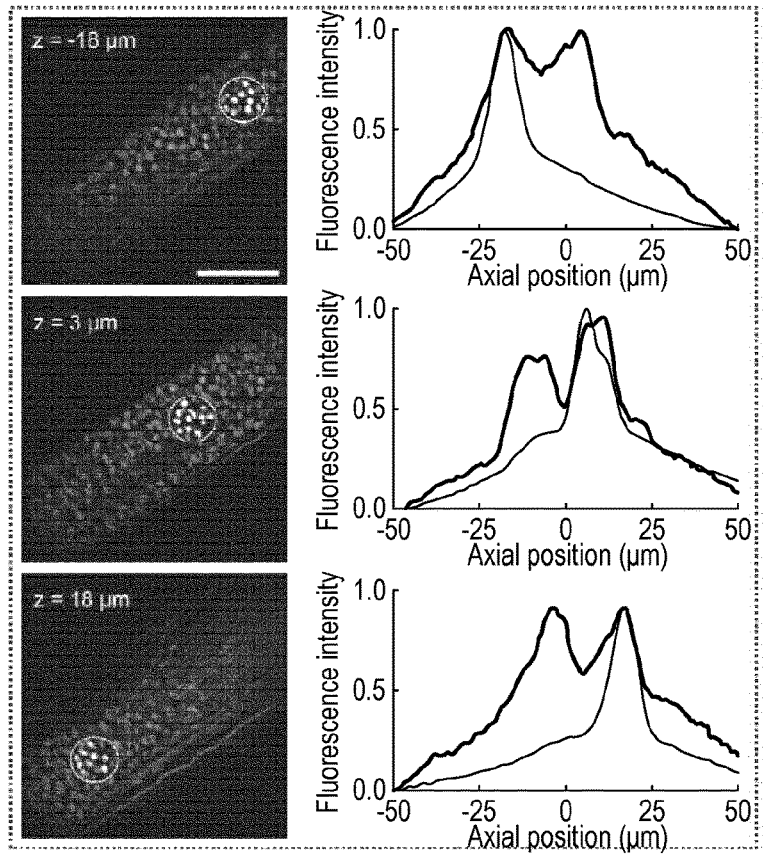

FIG. 4d: Simultaneous three-dimensional photoconversion of neural ensembles. Overlaid HiLo pre- and post-photoconversion images (left), where three 35-µm-diameter holographic spots projected at z=−18 µm, 3 and 18 µm were used for photoconversion (0.03 mW/µm², 2000 pulses of 50 ms). Axial distributions of pre-(light-grey solid line) and post-photoconversion (dark-grey dashed line) integrated fluorescence intensity for every plane and ROI are shown on the right. Green fluorescence (light-grey solid line) revealed the bi-layer structure of the Kaede-expressing neurons, whereas the red fluorescence (dark-grey dashed line) showed the axial precision of photoconversion confirming the system's accuracy when aiming at neural ensembles. $\lambda_{phot}$=800 nm; Scale bars: 60 µm.

Figure 5:
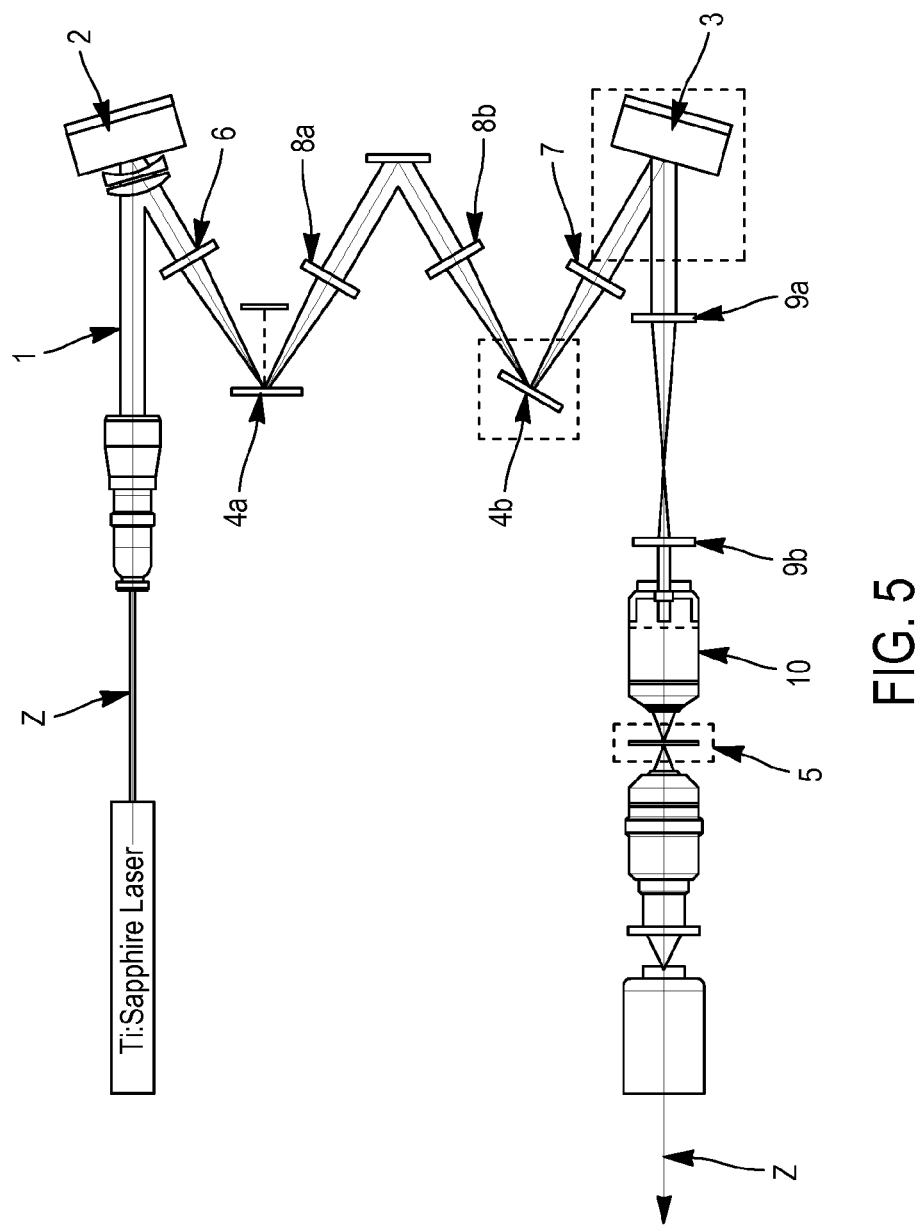

FIG. 5: Schematic of an optical setup for 3D CGH-TF with a digital micromirror device (DMD) 4a for fast pattern modulation.

Figure 6:
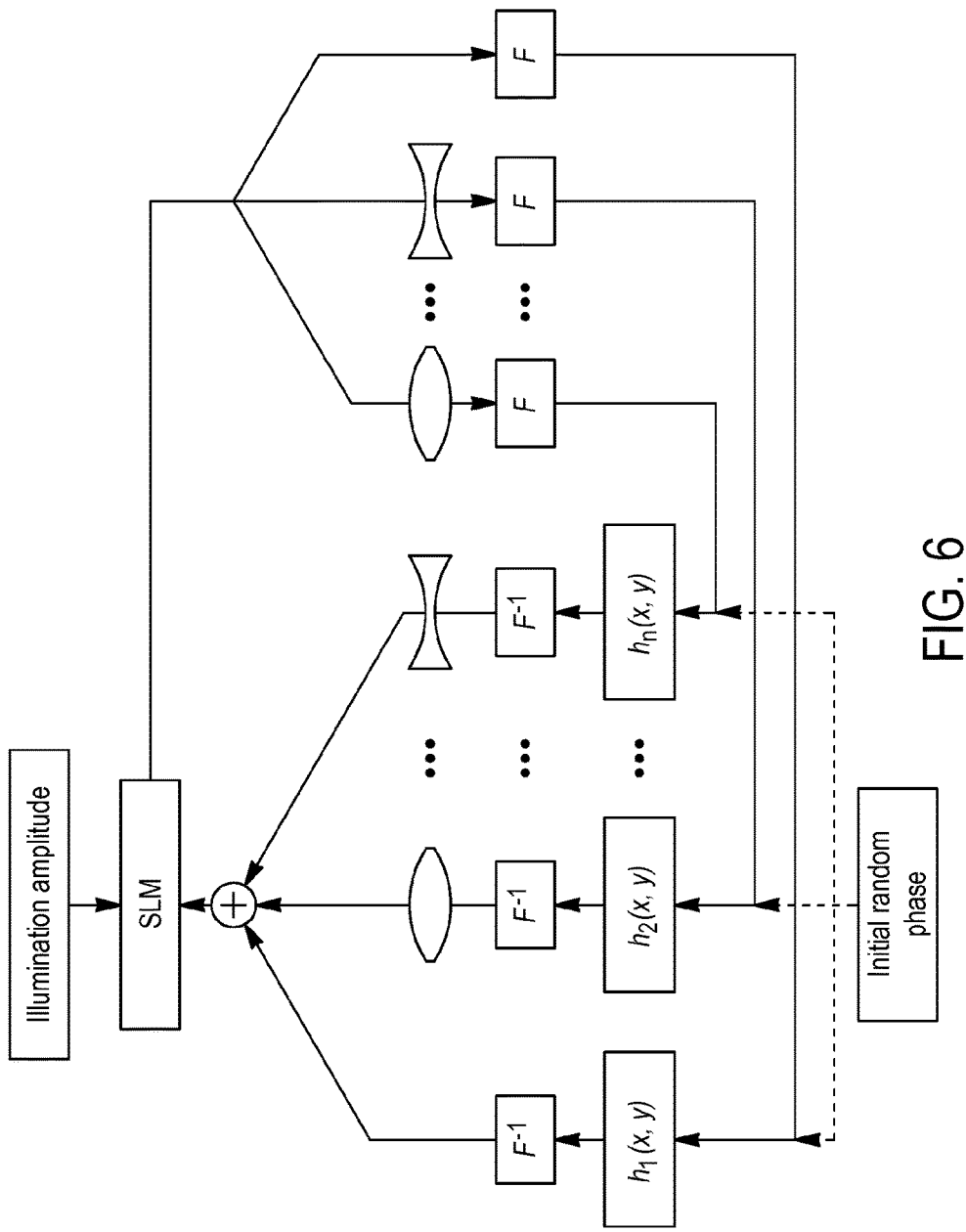

FIG. 6: 3D Gerchberg and Saxton algorithm. Schematic diagram of the 3D-GS algorithm adapted from Haist et al.

(Optics Communications Vol. 140, 299-308, 1997). In the iterative process, two lenses are used to link the moduli between each axial plane and the SLM plane. The focal lengths of the two lenses are of equal power and opposite signs so they cancel each other at the SLM during iteration. Under this condition, back and forth propagation of the electric field, converges to an approximation of our light intensity targets ($h_n$) that enables light shaping in multiple axial planes. The final hologram to be addressed to the SLM is the phase profile resulting from the combination of the N electric fields arriving to the SLM plane.

FIG. 7: SLM diffraction efficiency characterization and correction.

FIG. 7a, Maximum projection of 10-µm-diameter holographic spots projected individually in positions forming a 15×15 grid.

FIG. 7b, Map of the diffraction efficiency for each spot in a, normalized to the one of the central spot. Each pixel corresponds to one spot.

FIG. 7c, Histogram of the integrated intensity of the spots.

FIG. 7d, Same as in FIG. 7a after applying intensity compensation. In this case, homogenization of light distribution was achieved by projecting 4 extra spots out of the camera field of view (FOV) enabling to keep the spot intensity for each position in the grid constant.

FIG. 7e, Map of the compensated lateral diffraction efficiency.

FIG. 7f, Histogram of the integrated intensity of the compensated spots showing a two-fold decrease in the distribution width of the spots' intensity.

FIG. 7g, Axial diffraction efficiency normalized to the one of a spot centered and placed at the nominal focal plane. Experimental data points, which represent the average of four realizations (light-grey crosses), follow a Lorentzian function (light-grey dashed line) with $\Delta z_{FWHM}$=360 µm. Weighting the axially displaced holographic spot intensity according to the calculated diffraction efficiency, enables intensity equalization between holographic patterns in separated axial positions (dark-grey crosses and dashed line represent the corrected intensity ratio and fitting, respectively). Vertical error bars show the standard deviation of four realizations.

FIG. 7h, Input patterns to the GS algorithm used to calculate the holograms that generate the holographic patterns shown in FIG. 1b: low-diffraction efficiency regions appear brighter over those closer to the field of excitation (FOE) center. Here, the amplitude scale of the images was chosen from 0.9 to 1.1, to enhance the differences for better illustration.

FIG. 8: Axial confinement and lateral spot size.

Figure 8A:
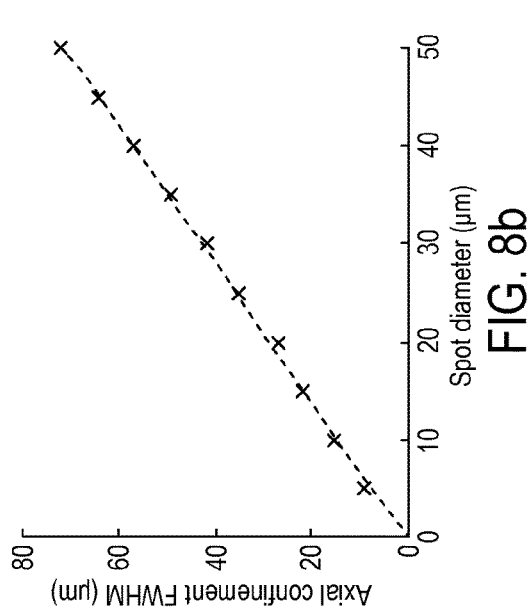
Figure 8B:
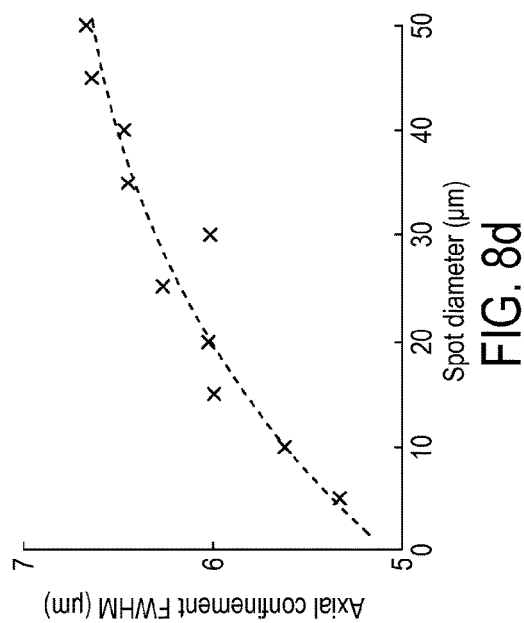

FIG. 8a, Measured axial profiles and,

FIG. 8b, axial confinement (FWHM) of the 2P integrated fluorescence intensity distribution produced by circular holographic spots of increasing size (5-50 µm in diameter).

Figure 8C:
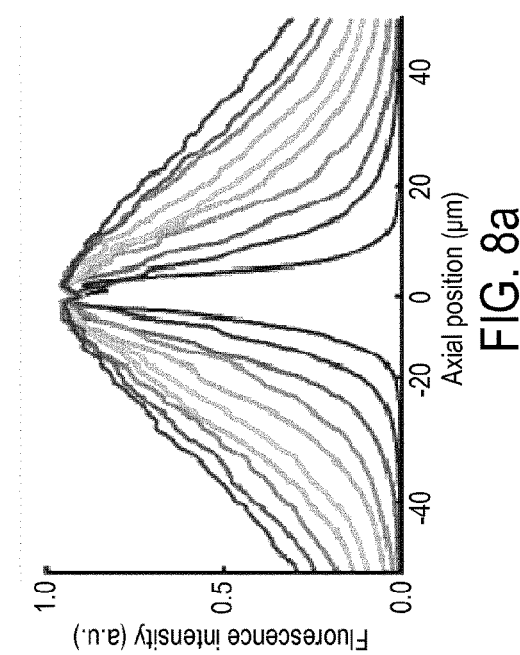

FIG. 8c, measured axial profiles

Figure 8D:
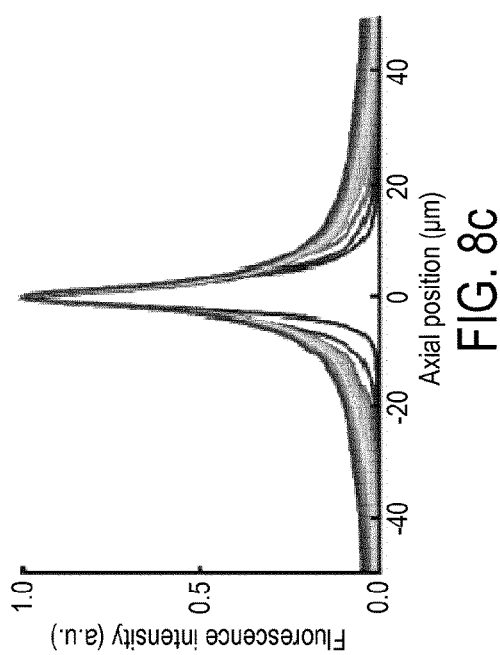

FIG. 8d, axial confinement (FWHM) of the 2P integrated fluorescence intensity distribution produced by temporally focused holographic spots of increasing size (5-50 µm in diameter).

FIG. 9: Remote axial displacement of a temporally focused holographic spot 511. x-y cross sections of a holographic temporally focused spot of 20-µm in diameter displaced across an axial range of 0-300 µm. The shape of the spot remains unchanged for axial displacements within the aliasing free range (|Δz|=130 µm). For |Δz|>130 µm the spot uniformity start to deteriorate and speckle size increases due to aliasing in the lens phase profile and therefore a reduction of the effective objective NA.

FIG. 10: 3D CGH-TF algorithm scheme.

Figure 10A:
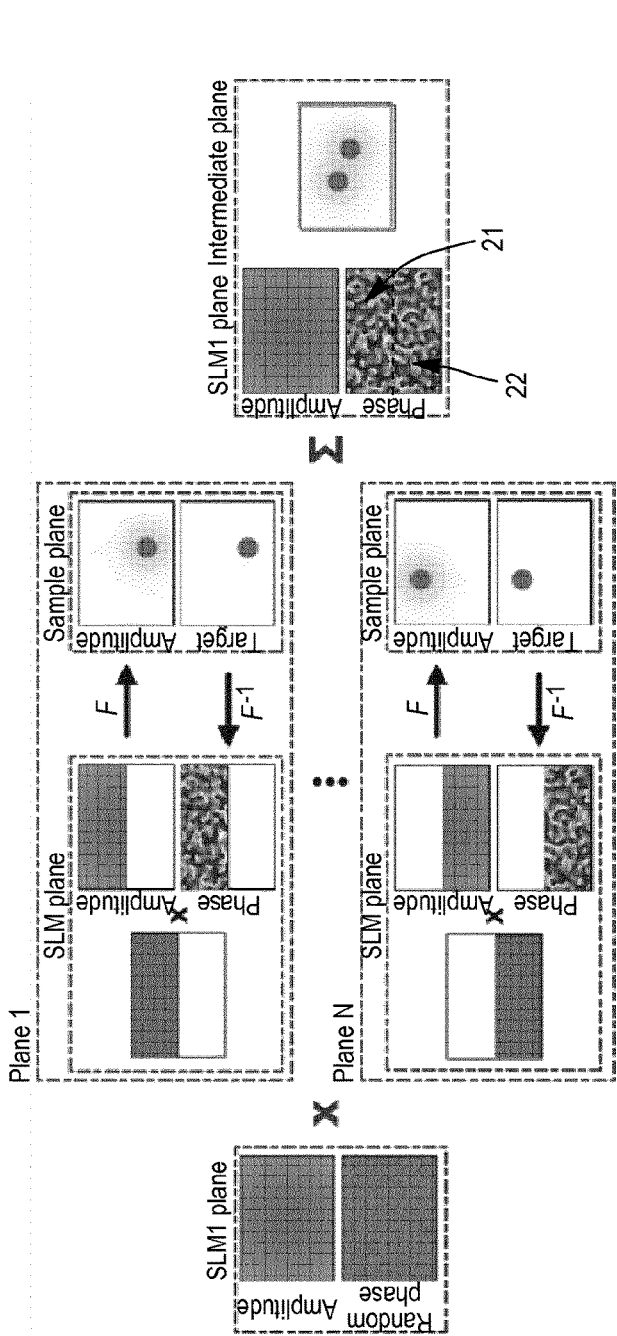

FIG. 10a (left), the first SLM 2 is vertically tiled into two rectangular regions 21, 22 equivalent to the number of axial planes 51, 52 in the final 3D pattern. Each of these regions is addressed with an independent phase-hologram calculated with a modified GS algorithm where the illuminating light distribution is set constant across the region of interest and zero elsewhere. This way, we obtain distinct phase profiles each encoding for a distinct holographic pattern (right).

Figure 10B:
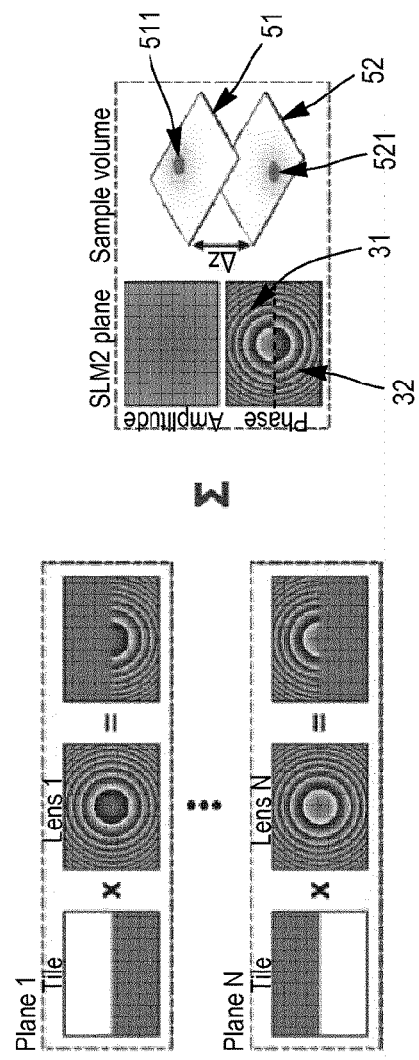

FIG. 10b (left), the second SLM 3 is addressed with vertically tiled Fresnel-lenses phase profiles 31, 32, each of them controlling for the axial position of the conjugated holograms 511, 521 at the first SLM 2. As a result, different targets are displaced at distinct axial planes 51, 52 (right).

FIG. 11: Light propagation through the optical setup.

FIG. 11a-c, top panels: x-y intensity distribution at: a, the first SLM 2, b, the second SLM 3, and, c, the back aperture of the objective 10. a-c, bottom panels: line profiles across the x-y intensity distributions at first SLM (solid line), the second SLM and the objective, respectively (dashed lines indicates x-axis and dashed-dotted y-axis). Light-grey dashed lines and dashed-dotted lines indicate the lateral aperture edges in the x and y direction, respectively.

FIG. 11d, Calculated light distribution at the second SLM 3 as described by Equation 15 (light-grey dashed line) and Equation 16 (dark-grey dashed line) described in Supplementary Note 2.

FIG. 11e, Light distribution passing through the objective as a function of the fraction of the illuminated SLM area. Solid curve represents the experimental data and dashed curve represents the theoretical curve described by Equation 20, in Supplementary Note 2.

FIG. 12: Tilt correction using symmetric tiling.

FIG. 12a-b, Tiled phase profiles 21, 22, 31, 32 addressed to first SLM 2 and second SLM 3 encoding two 15-µm-diameter spots 511, 521 axially displaced by −25 µm (spot A) and +25 µm (spot B) from the objective focal plane. Asymmetric tiling (FIG. 12 a), introduces a tilt on the propagation (c), as it implies an asymmetric illumination of the objective back aperture for each phase profile. Even though this tilt has no significant impact on the axial resolution of the spots, e, we can correct it, d, by using symmetric tiling of the phase profile for each plane, along the vertical axis of the SLM, (FIG. 12b).

FIG. 12c-d, Orthogonal maximum intensity projection

FIG. 12e-f, axial distribution of the integrated fluorescence intensity for each case a and b, respectively (Spot A: light-grey line, Spot B: dark-grey line).

FIG. 13: 3D CGH-TF setup combined with HiLo imaging.

Figure 13B:
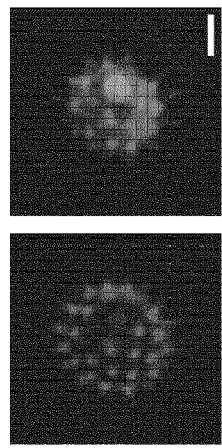
Figure 13C:
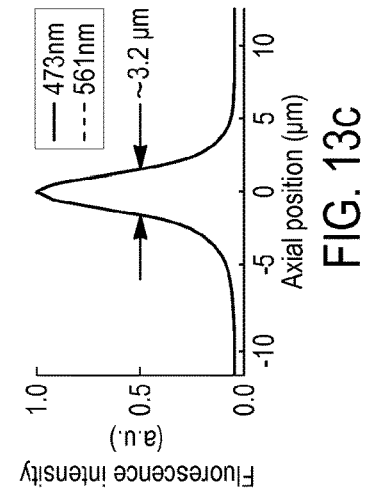
Figure 13A:
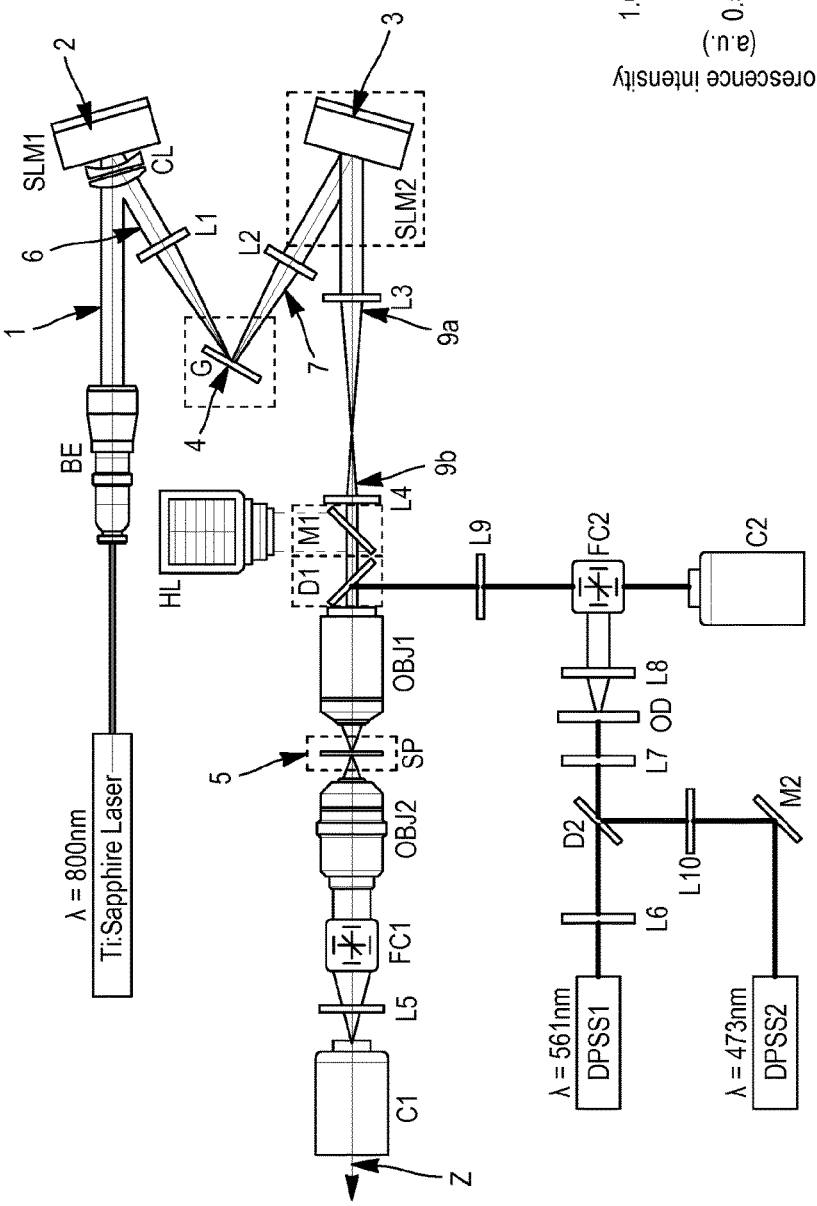

FIG. 13a, The optical setup for CGH and TF was combined with a two-color HiLo imaging setup to better resolve fluorescent neurons expressing Kaede in zebrafish. Continuous wave (CW) 473-nm and 561-nm lasers were used to excite green and red Kaede fluorescence state, respectively. The two laser beams join the same optical path on D2 (dichroic mirror) and are collimated through lenses L6, L7 and L10 on a oscillating diffuser (OD) that is imaged through lenses L8 and L9 at the back aperture of the excitation objective OBJ1. The HiLo beams join the excitation path on D1 (dichroic mirror), which also reflects collected fluorescence to a CMOS camera (C2) through the appropriate filter cube (FC2) for green or red fluorescence. For HiLo microscopy two fluorescence images are acquired for each plane: one with the oscillating diffuser in steady state, which produces a speckle illumination, and one with the oscillating diffuser in motion, in which the speckle pattern is smoothed out producing a uniform illumination image. A halogen lamp (HL) was used to perform transmitted light imaging of the sample through a removable mirror (M1) that helped on identifying the different regions of interest. Transmission images were recorded on a CCD camera (C1) through OBJ2.

FIG. 13b, HiLo fluorescence images of a pollen grain taken on the red (left) and green (right) channels. Scale bar: 10 μm. c, Axial resolution of the HiLo imaging system (dark-grey curve for green fluorescence, light-grey curve for red fluorescence).

FIG. 14: Two-photon neural ensembles photoconversion with 3D CGH.

FIG. 14a, Overlaid HiLo pre- and post-photoconversion images (top). We used a 35-μm-diameter holographic spot (dashed circle) to photoconvert neural ensembles (0.04 mW/μm², 200 illumination pulses of 50 ms). The spot was focused at the upper Kaede-expressing layer (z=4 μm). However, merged HiLo images showed significant photoconversion levels also in the lower layer (z=−10 μm). Scale bar: 30 μm.

FIG. 14b, Axial distribution of integrated fluorescence intensity profiles in green (light-grey line) and red (dark-grey line) channels showing the lack of axial confinement when photoconversion of large areas is performed without temporal focusing.

Supplementary Note 1: Excitation Volume

The calculations to determine the accessible volume of our CGH setup are similar to the ones described by Golan et al.[2] with the particularity that, in our system, the lateral displacement is controlled by the first SLM and the axial displacement by the second SLM (SLM1 and SLM2 respectively in FIG. 1a). The limited modulation depth together with the finite pixel size and pitch (i.e. the physical distance between pixels) of the SLM necessitate wrapping up the phase profile to achieve larger displacements. The maximum displacement (or the FOE) can be defined as the maximum aliasing-free displacement, i.e., when the sampling of the phase profiles satisfies the Nyquist theorem.

Lateral Displacement Limit

The phase profile required for a given lateral displacement, $x_0$, is $$\phi(x) = \frac{k}{f_{eq_1}} x_0 x, \tag{1}$$

where k is the wavenumber and $$f_{eq_1} = \frac{f_1 f_3 f_{obj}}{f_2 f_4}$$

is an equivalent focal length taking into account all the intermediate lenses of the telescopes. Imposing the aliasing-free condition[3], we obtain $$\frac{\delta\phi(x)}{\delta x} = \frac{k}{f_{eq_1}} x \leq \frac{\pi}{a}, \tag{2}$$

where a is the pixel pitch. Consequently, the maximum lateral displacement is $$|x_{max}| = \frac{\pi f_{eq_1}}{ka}, \tag{3}$$

which in our case leads to a field of excitation: FOE=2|$x_{max}$|=240 μm.

Axial Displacement Limit

Within the approximation of small defocus and high NA, the phase profile required for a given axial displacement, $\Delta z$, in polar coordinates describes a spherical function $$\phi(r) = k\Delta z \sqrt{n^2 - \frac{r^2}{f_{eq_2}^2}}, \tag{4}$$

where n is the index of refraction of the immersion medium, $\Delta z$ is the axial displacement and $$f_{eq_2} = \frac{f_3 f_{obj}}{f_4}.$$

Following the same criteria as above, $$\frac{\delta\phi(r)}{\delta r} = -\frac{rk\Delta z}{f_{eq_2}\sqrt{n^2 f_{eq_2}^2 - r^2}} \leq \frac{\pi}{a}. \tag{5}$$

The projection of the objective back aperture onto the SLM plane has a maximum radius of $$r_{max} = \frac{Df_3}{2f_4} = NAf_{eq_2}, \tag{6}$$

where D is the diameter of the back aperture and NA is the numerical aperture of the objective. Hence, the maximum axial displacement without aliasing is given by $$|\Delta z_{max}| = \frac{\pi f_{eq_2} \sqrt{n^2 - NA^2}}{akNA} \tag{7}$$

and in our case leads to a field of excitation: FOE$_z$=2|$\Delta z_{max}$|=261.13 μm.

Supplementary Note 2: Light Distribution in a 3D CGH-TF System

In order to optimize the optical design for 3D CGH-TF, is important to derive an expression to estimate the light distribution at the objective back focal plane and therefore the amount of light transmitted through the objective. To this end, let us first consider the propagation of a Gaussian beam having at the SLM1 plane a waist of 2σ and a spectral bandwidth $\sigma_\lambda$, and let us follow the propagation of the central wavelength, $\lambda_0$. Assuming a flat wavefront, the electric field distribution for the x-axis (orthogonal to the grating lines) of the beam illuminating SLM1 can be described by:

$$U^-_{SLM1_x}(x_1) = \frac{1}{\sqrt{2\pi}\,\sigma} e^{-\frac{1}{4}(\frac{x_1}{\sigma})^2} \qquad (8)$$

and after being cropped by the aperture of the SLM:

$$U^+_{SLM1_x}(x_1) = U^-_{SLM1}(x_1)\Pi(x/\Delta x_{SLM1}), \qquad (9)$$

$$\text{where } \Pi(x) = \begin{cases} 0 & \text{if } |x| > 1/2 \\ 1/2 & \text{if } |x| = 1/2 \\ 1 & \text{if } |x| < 1/2 \end{cases}$$

The first lens (L1; $f_1$) Fourier transforms the electric field $$U^-_{G_x}(x_2) = \frac{1}{\sqrt{\lambda f_1}} \int_{-\infty}^{\infty} U^+_{SLM1}(x_1) e^{-j\frac{2\pi}{\lambda f_1} x_1 x_2} dx_1, \qquad (10)$$

which impinges on the grating at an incidence angle $\theta_I$. Because of the oblique incidence, the electric field is stretched horizontally:

$$U^+_{G_x}(x_2) = \frac{1}{|\cos(\theta_I)|} U^-_G(\cos(\theta_I)x_2). \qquad (11)$$

The second lens (L2; $f_2$) Fourier transforms the electric field onto the second SLM (SLM2) plane:

$$\begin{aligned}
U^-_{SLM2_x}(x_3) &= \frac{1}{\sqrt{\lambda f_2}} \int_{-\infty}^{\infty} U^+_G(x_2) e^{-j\frac{2\pi}{\lambda f_2} x_2 x_3} dx_2 \\
&= \frac{1}{\sqrt{\lambda f_2}} \int_{-\infty}^{\infty} \frac{1}{|\cos(\theta_I)|} U^-_G(\cos(\theta_I)x_2) e^{-j\frac{2\pi}{\lambda f_2} x_2 x_3} dx_2 \\
&= \frac{1}{\sqrt{\lambda f_2}} \int_{-\infty}^{\infty} \frac{1}{|\cos(\theta_I)|} \frac{1}{\sqrt{\lambda f_1}} \int_{-\infty}^{\infty} U^+_{SLM1}(x_1) e^{-j\frac{2\pi}{\lambda f_1} x_1 x_2 \cos(\theta_I)} dx_1 e^{-j\frac{2\pi}{\lambda f_2} x_2 x_3} \\
&= \frac{1}{|\cos(\theta_I)|} \frac{1}{\sqrt{\lambda f_1}} \frac{1}{\sqrt{\lambda f_2}} \int_{-\infty}^{\infty}\int_{-\infty}^{\infty} U^+_{SLM1}(x_1) e^{-j\frac{2\pi}{\lambda f_1} x_1 x_2 \cos(\theta_I)} dx_1 e^{-j\frac{2\pi}{\lambda f_2} x_2 x_3} \\
&= \frac{1}{|\cos(\theta_I)|} \frac{1}{\lambda\sqrt{f_1 f_2}} \int_{-\infty}^{\infty}\int_{-\infty}^{\infty} U^+_{SLM1}(x_1) e^{-j\frac{2\pi}{\lambda f_1} x_1 x_2 \cos(\theta_I)} dx_1 e^{-j\frac{2\pi}{\lambda f_2} x_2 x_3} dx \\
&= \frac{1}{|\cos(\theta_I)|} \frac{1}{\lambda\sqrt{f_1 f_2}} \int_{-\infty}^{\infty} U^+_{SLM1}(x_1) \int_{-\infty}^{\infty} e^{-j\frac{2\pi}{\lambda f_1} x_1 x_2 \cos(\theta_I)} e^{-j\frac{2\pi}{\lambda f_2} x_2 x_3} dx_2 dx \\
&= \frac{1}{|\cos(\theta_I)|} \frac{1}{\lambda\sqrt{f_1 f_2}} \int_{-\infty}^{\infty} U^+_{SLM1}(x_1) \delta\left(\cos(\theta_I)\frac{x_1}{\lambda f_1} + \frac{x_3}{\lambda f_2}\right) dx_1.
\end{aligned} \qquad (12)$$

Applying the general scaling property of the Dirac delta function, $(\delta(ax-x_0)=\delta(x-x_0/a)/|a|)$, this equation reduces to:

$$U^-_{SLM2_x}(x_3) = \frac{1}{\cos^2(\theta_I)} \sqrt{\frac{f_1}{f_2}} U^+_{SLM1}\left(-\frac{1}{\cos(\theta_I)}\frac{f_1}{f_2} x_3\right). \qquad (13)$$

The lateral stretching of the electric field at the grating plane translates into a proportional shrinking at the SLM2 plane. The grating linearly diffracts all spectral components that are then collimated by L2 and impinge on SLM2 laterally shifted from the optical axis by:

$$\Delta x \approx \frac{f_2}{g}\Delta\lambda, \qquad (14)$$

where g is the grating grooves' period and $\Delta\lambda=|\lambda_0-\lambda|$.

The illumination intensity at SLM2 can be described as a convolution between the electric field distribution at the SLM2 plane for the central wavelength and the spectral distribution[4]:

$$\begin{aligned}
I^-_{SLM2_x}(x) &= \int_{-\infty}^{\infty} |U^-_{SLM2}(x, \Delta\lambda)|^2 d\Delta\lambda \\
&= \left|U^+_{SLM1}\left(-\frac{1}{\cos(\theta_I)}\frac{f_1}{f_2}x\right)\right|^2 \otimes e^{-\frac{1}{2}(\frac{\Delta\lambda}{\sigma_\lambda})^2} \\
&\simeq e^{-\frac{1}{2}(\frac{x}{(\sigma_x\cos(\theta_I)f_2/f_1)})^2} \Pi\left(\frac{x}{\Delta x_{SLM1}\cos(\theta_I)f_2/f_1}\right) \otimes \\
&\quad e^{-\frac{1}{2}\frac{x^2}{(\frac{f_2\sigma_\lambda}{g})^2}} \\
&\simeq \int_{-c}^{c} e^{-a\tau^2 - b(x-\tau)^2} d\tau \\
&\simeq e^{-\frac{abx^2}{a+b}}\left(\text{erf}\left(\frac{(a+b)c - bx}{\sqrt{a+b}}\right) + \text{erf}\left(\frac{(a+b)c + bx}{\sqrt{a+b}}\right)\right)
\end{aligned} \qquad (15)$$

where $a = \frac{1}{2}(\sigma_x \cos(\theta_I)f_2/f_1)^{-2}$, $b = \frac{1}{2}\left(\frac{f_2\sigma_\lambda}{g}\right)^{-2}$, $$c = \frac{1}{2}\Delta_{x_{SLM1}} \cos(\theta_I) f_2/f_1,$$

and $\tau$ is the dummy variable of the convolution. For simplicity, we have omitted the proportionality factors. This equation simplifies if we neglect the effect of the SLM1 aperture. Under this approximation $$|x| \ll \frac{c}{b}(a+b),$$

and one can derive from equation (15) the light distribution at SLM2 and therefore at the objective back aperture along the x-axis:

$$I^-_{SLM2_x}(x) = e^{-\frac{abx^2}{a+b}}. \tag{16}$$

Equations (15) and (16) are plotted in FIG. 11*d* (light-grey and dark-grey lines, respectively). For our experimental conditions, the discrepancy between these two curves is less than 1%.

Light distribution along the y-axis on SLM2 can be obtained in a similar way, but without having in that case any shrinking coefficient or linear dispersion by the grating:

$$I^-_{SLM2_y}(y) = e^{-\frac{1}{2}\left(\frac{f_1}{f_2}\frac{y}{\sigma}\right)^2}. \tag{17}$$

The y-light distribution is also plotted in FIG. 11.

We can also derive the analytical expression for the FWHM of the illumination distribution along the x- and y-axis:

$$\sigma_{x_{BFP}} = \frac{f_4}{f_3}\sqrt{\frac{2\sigma^2\cos(\theta_I)^2 f_2^2}{f_1^2} + \frac{2f_2^2\sigma_\lambda^2}{g^2}} \tag{18}$$

$$\sigma_{y_{BFP}} = \frac{f_2}{f_1}\frac{f_4}{f_3}\sigma.$$

The same formalism can be applied to derive the analytical expression for the FWHM of the illumination distribution along the x- and y-axis for a conventional TF system, i.e. with a collimated Gaussian beams illuminating the TF grating. This can be done by taking for the illumination of SLM1 a Gaussian beam with an initial small beam waist. For instance, a Gaussian beam of approximately 300 µm in diameter at SLM1 will generate a 10-µm-diameter spot at the sample plane. In this limit $$\frac{2\sigma^2\cos(\theta_I)^2 f_2^2}{f_1^2} \ll \frac{2f_2^2\sigma_\lambda^2}{g^2}$$

and equations (18) become:

$$\sigma_{x_{BFP}} \approx \sqrt{2}\frac{f_4}{f_3}\frac{f_2}{d}\sigma_\lambda \tag{19}$$

$$\sigma_{y_{BFP}} = \frac{f_2}{f_1}\frac{f_4}{f_3}\sigma.$$

Equations (18 and 19) can be particularly practical for designing temporal focusing experimental setups.

Finally, in order to properly resize hologram tiles and produce equal intensity patterns, we calculate the energy distribution passing through the objective as a function of the vertical position:

$$I^+_{BFP}(y) = \int_{-\sqrt{(D/2)^2-y^2}}^{\sqrt{(D/2)^2-y^2}} I^+_{SLM2}\left(\frac{f_4}{f_3}x\right)I^+_{SLM2}\left(\frac{f_4}{f_3}y\right)dx \tag{20}$$

$$= \int_{-\sqrt{(D/2)^2-y^2}}^{\sqrt{(D/2)^2-y^2}} e^{-\frac{ab}{a+b}\left(\frac{f_3}{f_4}\right)^{1/2}x^2-dy^2}dx$$

$$= e^{-dy^2}\mathrm{erf}\left(\sqrt{\frac{1}{2}\frac{ab}{a+b}\left(\frac{f_3}{f_4}\right)^{\frac{1}{2}}\left[\left(\frac{D}{2}\right)^2-y^2\right]}\right),$$

where $d = \frac{1}{2}\left(\frac{\sigma_{xy}f_2f_4}{f_1f_3}\right)^{-2}$ and D represents the aperture of the objective. This distribution was experimentally verified and the results are plotted in Supplementary FIG. 6*f*. The size of the vertical tiles of the SLM for each plane was chosen by taking into account this distribution, the diffraction efficiency (FIG. 11*e*) and the total area of each holographic pattern.

General Description of the Optical Device of the Invention

As drawn on FIGS. 1*a*, 5 and 13*a*, the invention concerns an optical system for shaping the wavefront of the electric field of an input light beam 1 to be projected into a target volume 5, including:

a first optical element 2, which is a spatial light modulator used to control light distribution, through phase and/or amplitude modulation of the electric field of the input light beam, forming 2D illumination patterns in at least one transverse plane 51, 52, 53 in the target volume 5 in regard to an optical axis z, the first spatial light modulator being divided in a number of first independent regions 21, 22, each of these first independent regions 21, 22 being used to generate a 2D illumination pattern 511, 521 focused onto at least one intermediate optical element 4, at least one intermediate optical element 4 being located, on an optical axis, after the first optical element 2 on a trajectory of the light beam 1 and where an image of the 2D illumination patterns is formed, for modulating the phase and/or the amplitude of the light beam, and a second optical element 3 for modulating the phase and/or the amplitude of the light beam and used to control the axial position of the at least one transverse plane 51, 52, 53 in the target volume 5, the second optical element 3 being situated on the optical axis after, the at least one intermediate optical element 4 on the trajectory of the light beam 1 at a plane that is optically conjugated to the plane of the first optical element 2.

In a first embodiment, the intermediate optical element 4 is a dispersive grating performing temporal focusing of the light beam 1. The dispersive grating in the invention is used to improve axial confinement of the transverse plane(s) 51, 52, 53.

In contrast to the state of art, where there is only one spatial light modulator (SLM) to perform both pattern generation and axial position control of the transverse plane, the invention uses a two-SLM strategy. That is, the first SLM 2 generates 2D light patterns and the second SLM 3 controls their axial position in the target volume. This, contrary to existing configurations, enables remote and non-mechanical scanning of spatiotemporally focused holographic patterns and three-dimensional spatiotemporal focused pattern generation in multiple transverse plane(s) 51, 52, 53.

The combination with temporal focusing enables enhanced axial confinement, ~5.5-9.5 µm within the aliasing-free region ($|\Delta z| \leq 130$ µm) in the invention, in comparison to the value of ~31.5-38.5 µm of the axial confinement in the state of art within the same range.

In a second embodiment, the intermediate optical element 4 is a spatial light modulator, for instance a digital micromirror device for fast modulation and select the illumination patterns on one transverse plane.

In a variant of the first and second embodiment represented on FIG. 5, the optical system comprises at least two intermediate optical elements 4.

A first intermediate optical element 4a is located in two possible locations.

A. In the first case, a first intermediate optical element 4a is located at a front focal plane of a first lens 6 situated between the first optical element 2 and the first intermediate optical element 4a, such that the first intermediate optical element 4a is located at a Fourier plane of the lens 6.

A last intermediate optical element 4b is located at the back focal plane of a second lens 7 situated between the last intermediate optical element 4b and the second optical element 3, such that the second optical element 3 is located at a Fourier plane of the second lens 7.

For instance, in the first case A, we can have a grating as first intermediate optical element 4a, and a DMD as a last intermediate optical element 4b.

B. In the second case, a first intermediate optical element 4a is located at a back focal plane of a third lens 8a that together with a fourth lens 8b form a telescope that images the plane of the first intermediate optical element 4a to the plane of the first intermediate optical element 4b, such that a first image of the 2D illumination patterns is created on the first intermediate optical element 4a and a second image is formed on the second intermediate optical element 4b.

For instance, in the second case B, we can have a DMD as first intermediate optical element 4a, and a grating as a last intermediate optical element 4b.

In another variant of the first and second embodiment in regard to intermediate optical element 4, as represented on FIGS. 1a and 13, the optical system comprises only one intermediate optical element 4 and the intermediate optical element 4 is located at a front focal plane of a first lens 6 situated between the first optical element 2 and the intermediate optical element 4, such that the intermediate optical element 4 is located at a Fourier plane of the first lens 6, the intermediate optical element 4 is located at the back focal plane of a second lens 7 situated between the intermediate optical element 4 and the second optical element 3, such that the second optical element 3 is located at a plane that is conjugated to the plane of the first optical element 2.

We can have more than two intermediate optical elements 4a, 4b.

In a first embodiment concerning the second optical element 3, the second optical element 3 is a spatial light modulator to control the axial position of the at least one transverse plane 51, 52 in the target volume 5.

In a second embodiment concerning the second optical element 3, the light beam 1 is projected on a unique transverse plane 51 in the target volume 5, and the second optical element is a tunable lens for controlling the axial position of the unique transverse plane 51.

The embodiments with different second optical elements 3 (spatial light modulator or tunable lens) can be applied with the different embodiments concerning the intermediate optical element 4, 4a, 4b (DMD or grating for instance) as described above.

This means that we can have an intermediate optical element 4, 4a, 4b which is a dispersive grating performing temporal focusing of the light beam 1 and a second element 3 which is a spatial light modulator or a tunable lens.

With this embodiment, the patterns generated by the first optical element 2 are temporally focused by the dispersive grating 4 and then displaced axially by the second optical element 3, which is the spatial light modulator or the tunable lens.

We can also have an intermediate optical element 4, which is a digital micromirror device and a second optical element 3 which is a spatial light modulator or a tunable lens.

With this embodiment, the patterns generated by the first optical element 2 are modulated by the digital micromirror device and then displaced axially by the second optical element 3, which is the spatial light modulator or the tunable lens.

We can also have several intermediate optical elements 4a, 4b and a second element 3, which is a spatial light modulator or a tunable lens.

We can also have at least one intermediate optical element 4, 4a, 4b which is a dispersive grating performing temporal focusing of the light beam 1, coupled with one intermediate optical element 4, 4a, 4b which is a digital micromirror device, and a second element 3 which is a spatial light modulator or a tunable lens.

As represented on FIG. 1a, 13, the second optical element 3 is located at a back focal plane of a third lens 9a, which together with a fourth lens 9b form a telescope to image the plane of the second optical element 3 to the back focal plane of an objective lens 10.

The first optical element 2 can be a phase and/or amplitude spatial light modulator.

The first optical element 2 can be a digital micromirror device.

The digital micromirror device can be used as a phase or an amplitude spatial light modulator.

All the embodiments mentioned before between the first optical element 2, the second optical element 3 and the one or several intermediate optical elements 4 can be combined as described on page 21.

In an embodiment, two intermediate optical elements 4 are located at two distinct planes on a trajectory of the light beam 1, and at least one intermediate lens is located between the first and the second intermediate optical element 4.

In a variant, the second optical element 3 is a phase spatial light modulator, located after the last intermediate optical element 4, which is programmed to compensate for optical aberrations introduced by the optical elements of the system or the sample.

In a first application of the invention, the optical system is used to generate a two-dimension (2D) holographic pattern 511 focused in a transverse plane 51 of the target volume 5, where the first optical element 2 is used to control the 2D holographic pattern in the transverse plane 51 of the target volume 5, and where the second optical element 3 is used to control the axial position of the transverse plane 51 on the optical axis z in the target volume 5.

The second element is a spatial light modulator addressed with a spherical phase function.

In a second application of the invention, the optical system is used to generate a 3D holographic pattern composed of a plurality of 2D holographic patterns 511, 521, 531 focused into the target volume 5 onto different transverse planes 51, 52, 53, which are positioned on different positions on the optical axis, each 2D holographic pattern 511, 521, 531 corresponds to a different transverse plane 51, 52, 53, where the first spatial light modulator is divided in a number of first independent regions 21, 22 equivalent to the number of transverse planes 51, 52, 53, each of these first independent regions 21, 22 is used to generate a 2D holographic pattern 511, 521, 531 focused onto the at least one intermediate optical element 4, and where the second optical element 3 is a spatial light modulator divided in a number of second independent regions 31, 32 equals to the number of first independent regions 21, 22, each second independent region controlling the axial position in the target volume 5 of the corresponding 2D holographic pattern 511, 521, 531 generated by the first spatial light modulator.

The second spatial light modulator can be addressed with cropped spherical phase functions in each second independent region.

The phase profiles addressing the first independent regions 21, 22 onto the first spatial light modulator are programmed to compensate a transverse-position-dependent light intensity decrease.

The first and second independent regions 31, 32 are parallel to the orientation of the grating lines of the dispersive grating.

For each first and second independent region the back aperture of the objective 10 is illuminated in a symmetric way with respect to a vertical axis of the spatial light modulator and to a horizontal axis of the spatial light modulator.

The size of the first and second independent regions 31, 32 encoding each transverse plane 51, 52, 53 on the spatial light modulators is adjusted to compensate an axial-position-dependent light intensity decrease.

2D holographic patterns are generated by addressing the first spatial light modulator with a phase profile—computer-generated hologram—calculated with an iterative Fourier transform algorithm.

The present invention differs from previous systems suggesting temporal modulation of a laser beam with pulse shapers using a SLM between two gratings, and then spatial modulation with another SLM, and which is described for instance in the US Patent US20150010029. In those systems the first SLM of the pulse shaper performs modulation of the spectral phase of the laser beam, thus modulating the temporal profile (pulse duration) of the beam, and the second SLM performs spatial phase modulation of the laser beam wavefront, modulating the intensity distribution of light. The invention uses two SLMs to perform spatial phase modulation of the laser beam wavefront on both of them, thus modulating the light intensity distribution in space. Moreover, in the embodiments using TF, the invention uses one single grating for separating the spectral components of a laser pulse. The laser beam impinges once on the grating and when it is collimated by a first lens and focused by a second one (for instance the microscope objective), the output beam (for instance at the sample volume) has a pulse duration that changes continuously as the beam propagates through the optical axis: it is compressed as it propagates through the sample, reaching its peak value at the focal plane, and stretching again as it propagates beyond it, what gives rise to a temporal focus. A pulse shaper of the state of art in contrast uses two gratings, one to disperse the spectral components and one to recombine them to form again the laser pulse, after modulation of its temporal profile on the SLM. Thus, the output beam from a pulse shaper has a specific pulse duration that does not change with propagation of the beam. In other words, spatio-temporal modulation is different in the two systems.

Finally, the invention in one of its embodiments using a DMD as an intermediate optical element, without the grating for TF, can be also applied to systems using continuous wave and not pulsed lasers, while pulse shapers are applied only to systems using pulsed lasers.

Detailed Description of Preferred Embodiments

To complete the general description of the optical device of the invention, a detailed description is made.

For the generation of axially confined 3D illumination patterns, we demonstrated a new approach enabling remote axial displacement and/or remote axial scanning of temporally focused holographic patterns and 3D spatiotemporally focused pattern generation. This is achieved by performing a two-steps wavefront shaping of the input light field with two spatial light modulators (SLMs). The first optical element 2 (SLM1) is used to control the target transverse light distribution, the second optical element 3 (SLM2), placed after the grating for TF which is the intermediate optical element 4, is used to control the axial position(s) of the spatiotemporal focus plane(s).

We demonstrated ability for 3D light generation by simultaneous photoconversion with cellular resolution of neuronal cells expressing the Kaede protein in living zebrafish larvae. Tens of spinal cord neurons occupying separate axial planes were photoconverted with single cell precision, for an illumination period in the range of hundreds of milliseconds.

Optical System

The optical system is schematically depicted in FIG. 1a and described in detail in Methods. The output of a Ti:Sapphire laser was expanded to illuminate a first liquid crystal on silicon spatial light modulator (LCOS-SLM; the first optical element 2, SLM1) used to generated holographic light patterns at the focal plane of a first lens 6 where a blazed grating, G, was placed for temporal focusing. Two telescopes 7, 9a, 9b, 10 (L2, L3; L4, OBJ1) relayed the beam onto the sample plane. At the confocal plane of the first telescope 6, 7, a second LCOS-SLM (SLM2) was placed and used to generate 3D-CGH-TF patterns. The second optical element 3 (SLM2) plane was imaged at the back focal plane of the microscope objective through the second telescope. Holographic light patterns generated at the sample plane illuminated a thin fluorescent layer and the induced fluorescence was imaged on a CCD camera through a second objective placed opposite to the excitation one (OBJ2). For 3D reconstruction of illumination volumes, OBJ2 was fixed and focused on the fluorescent layer, while OBJ1 was moved along the axial direction with a piezo-scanning stage.

The setup enables, remote axial displacement and/or scanning of temporally focused holographic beams and generation of multiple distinct temporally focused holographic targets, as described in the following paragraphs.

State of the Art, which can be used for the invention

Three-dimensional Computer-generated Holography

At first, we demonstrate 3D generation of arbitrarily shaped patterns.

In this configuration, mirrors replaced the temporal-focusing grating, G, and the second optical element 3 (SLM2). Multiple targets located at separated axial planes were generated (FIG. 1b) by using a modified GS algorithm for 3D projection. Briefly, for each axial target two lens-phase-functions of opposite sign are inserted into the Fourier transform-based iterative process that relays the electric field distribution at the SLM and the sample plane. The first lens is added to the electric field distribution at the SLM plane and is used to control the axial position of the target in the sample volume. The second lens, of opposite sign, is added to the electric field distribution at the sample plane to cancel the effects of the first lens. This permits to project all targets into a single plane before the successive iteration (FIG. 6). Over previous implementations of 3D CGH, here, we minimize the effect of spherical aberrations introduced by the objective on targets generated out of the focal plane, by describing the objective focal sphere within the approximation of small defocus and high NA and therefore using for the lens-phase-profiles the spherical phase:

$$\phi(\rho)=k\Delta z(n^2-(NA)^2\rho^2)^{(1/2)} \quad (1),$$

where k is the free-space wavenumber, n is the refractive index of the immersion medium, NA is the numerical aperture of the objective, $\rho=r/(NA \cdot f_{eq1})*(f_{eq1}=f_{obj}*[f_1 \star f_3]/[f_2*f_4])$ is the normalized pupil at the first optical element 2 (SLM1) plane, and $\Delta z$ the axial displacement of the holographic light pattern in the sample volume.

In CGH, the LCOS-SLM pitch-size at the objective back focal plane sets, for a given wavelength, the maximum accessible volume for illumination and induces a position-dependent diffraction efficiency (defined as the ratio between the light illuminating the LCOS-SLM and the light diffracted in the holographic pattern) (Supplementary Note 1). In our system, equalization of light distribution across the entire illumination volume (Supplementary Note 1) was achieved by using, as the input for the 3D-GS algorithm, intensity graded patterns where targets falling into low-diffraction efficiency regions are brighter with respect to those corresponding to more efficient ones (FIG. 7).

Invention

Axial Displacement of Spatiotemporally Focused Holographic Patterns

Secondly, we demonstrate axial displacement of a temporally focused holographic spot by decoupling the input-beam phase modulation in two separate steps, controlling first the target lateral light distribution and secondly its axial position.

In CGH the axial extent of illumination patterns is linearly coupled to the lateral area (FIG. 8). Few years ago, we demonstrated that decoupling of lateral and axial target extent is possible by combining CGH with TF. This is achieved by inserting a grating for TF, which is the intermediate optical element 4 at an intermediate plane where a first image of the hologram is formed [in this case, the front focal plane of first lens 6 (L1)]. In this way, 2D CGH-TF patterns can be generated with the axial confinement of a line-scanning microscope and almost independent of their lateral extent (FIG. 8). However, opposite to the case of CGH, axial displacement of holographic temporally focused patterns is not achievable by simply adding a Fresnel-lens-phase modulation to the phase hologram. Indeed, the lens effect will displace the spatial focal plane with respect to the TF grating and spatial and temporal focal planes will no longer coincide.

Here, we solved this issue by presenting an alternative configuration using a second SLM (SLM2) placed at the focal plane of a second lens 7 (L2) and conjugated to the back focal plane of the objective 10. In this configuration, the first optical element 2 (SLM1) was used to generate 2D CGH illumination patterns focused onto the grating G, which disperses all spectral components of the illumination pattern onto the second optical element 3 (SLM2). The second optical element 3 (SLM2) was addressed with the Fresnel-lens-phase-function described in equation 1 [with $\rho=r/(NA \cdot f_{eq2})$; $(f_{eq2}=f_{obj}*[f_3]/[f_4])$] and used to control the axial position of the target in the sample (or target) volume 5. In this way, the spatial and temporal focal planes still coincided at the grating position and were jointly axially translated by the second optical element 3 (SLM2) across the sample (or target) volume 5.

The capability for remote axial control of temporally focused holographic patterns was demonstrated by axially displacing a holographic spot of 20 μm in diameter across an axial range of ±130 μm (FIG. 2a-b), which is the theoretical aliasing-free axial range, $FOE_z$ (Supplementary Note 1). Holographic patterns were remotely displaced across this range while well conserving sharpness of the illumination shape and axial confinement. The integrated 2P fluorescence intensity decreased of about a factor 5 at the edges due to the diffraction efficiency of the second optical element 3 SLM (Supplementary Note 1 and FIG. 7). We were also able to generate targets with micrometer axial confinement and sharp shapes across a broader axial range (±300 μm, i.e. ~2 times greater than $FOE_z$). However, in this range, broadening of the FWHM (~25 μm at ±300 μm), decrease of the fluorescence intensity (~10 times at ±300 μm) and deterioration of the spot quality became more significant (FIG. 2c and FIG. 9). This is a consequence of several factors including optical aberrations, the diffraction efficiency of the second optical element 3 (SLM2), and the finite size of the optical elements placed after the second optical element 3 (SLM2).

For applications requiring constant illumination across the whole axial range, the position-dependent intensity decrease can be compensated by attenuating the illumination level for axial positions close to the centre of the FOE. This can be done either by reducing the incident laser power or by redirecting light into an extra spot similarly as in FIG. 7.

3D CGH-TF: Three-dimensional Spatiotemporally Focused Patterns

Lastly, we demonstrated that placing a second optical element 3 (SLM2) at a conjugated plane of a first optical element 2 (SLM1) also enables 3D spatiotemporally-focused pattern generation.

At first, the first optical element 2 (SLM1) is divided in a number of vertically (i.e. parallel to the orientation of the grating lines and orthogonal to the grating linear dispersion) first tiled regions equivalent to the number of axial planes 51, 52 . . . of the final 3D pattern along the axis z. Each of these first regions 21, 22 . . . is used to calculate 2D holograms that were focused through L1 at the TF grating plane (FIG. 3a top, FIG. 10). Independent axial displacement of the different planes was then achieved by addressing the second optical element 3 (SLM2) with an equal number of independent vertically tiled lens-phase profiles in second tiled regions 31, 32 . . . each controlling the axial position of the corresponding target generated by the first optical element 2 (SLM1) (FIG. 3a, bottom).

In this configuration, for each of the n targeted planes 51, 52 . . . , both spatial and temporal foci coincided at the grating position, while the n phase-lens profiles addressed on the second optical element 3 (SLM2) enabled independent remote displacement of each shaped target in the sample volume. This enables multi-temporally-focused target generation (FIG. 3b-c).

Cropping the phase holograms sent on the first optical element 2 (SLM1) in the vertical direction had no effect on axial confinement (FIG. 3d). However, this unidirectional resizing of holograms is equivalent to spatial filtering the hologram in the vertical direction and thus induced a vertical elongation of the average speckle size within the holographic spot (FIG. 3e). More precisely, the vertical mean speckle size, estimated by calculating their vertical autocorrelation width, $\sigma_y$, reached about a factor two of the original size ($\sigma_y=2\sigma_{y\ min}$) when the hologram vertical size was smaller than one fourth of the full size of the SLM aperture (FIG. 3f). Opposite to $\sigma_y$, the axial autocorrelation width $\sigma_x$ is unaffected by the hologram vertical size (FIG. 3f).

Additionally, resizing the holograms affects the intensity of the illumination pattern at the sample plane: holograms projected at the centre of the back focal plane generated brighter targets than holograms projected on the side (FIG. 11 and Supplementary Note 2). This effect adds up to the position-dependent diffraction efficiency related to the SLM pixel size, described in the previous paragraph. Thus, generation of homogeneous 3D CGH-TF patterns required compensating for both effects. First, homogeneous lateral light distribution was achieved for each plane by following the procedure described in the previous paragraph and in FIG. 7. Second, homogeneous axial distribution was achieved by suitable rescaling the hologram size at the first optical element 2 (SLM1) as described in Supplementary Note 2 and FIG. 11. This enabled homogeneous intensity pattern generation (FIG. 3g) across the whole excitation volume. Axial cross section through holographic patterns generated at axially distinct planes showed that axial resolution was also well conserved, (FIG. 3c,g). However, an unavoidable background in the intermediate planes (FIG. 3g bottom right) appears when targets are axially and laterally aligned.

We should notice that addressing the second optical element 3 (SLM2) with Fresnel-lens profiles tiled along the vertical direction induced a lateral tilt on the intensity propagation due to the asymmetric illumination of the objective back focal plane. This effect could be eliminated by addressing the first optical element 2 (SLM1) and the second optical element 3 (SLM2) symmetrically above and below the vertical axis of the SLM, so that each hologram covered the objective pupil in a symmetric way (FIG. 12).

Finally, in the embodiment where as an intermediate optical element a DMD is used (without TF), tiling of the SLMs can be done in the vertical or horizontal direction of the plane of the SLM, or both.

In Vivo 3D Patterned Photoconversion of Neurons

Lateral and axial specificity of 3D CGH-TF patterns was demonstrated by performing in vivo 2P photoconversion of the Kaede protein expressed pan-neuronally in the double transgenic zebrafish larvae Tg(HuC:Gal4; UAS:Kaede). Kaede is a photoactivatable green fluorescent protein that, when exposed to UV light, undergoes a cleavage resulting in red shift of the fluorescence emission spectrum. In 2P excitation, efficient photoconversion is achieved for wavelengths in the range of 760-800 nm.

In our system, in order to monitor the efficiency of photoconversion, we combined 3D patterned photostimulation with a two-color HiLo (High/Low frequency sequential acquisition) imaging system (see Methods and FIG. 11). First, a HiLo z-stack exciting green fluorescence (excitation wavelength $\lambda_{exc}=473$ nm) was recorded to localize neurons expressing Kaede and used to select the targeted cells for photoconversion. 2P photoconversion was achieved by holographic illumination of the selected cells (stimulation time 0.2-100 s; excitation power: 0.03-4 mW/$\mu m^2$; Methods). A second HiLo z-stack exciting red fluorescence ($\lambda_{exc}=561$ nm) was recorded after the photostimulation protocol, in order to monitor the efficiency of photoconversion. Photoconversion induced an approximately 10-fold increase in red fluorescence ratio after and before 2P illumination.

In a first experiment, we simultaneously photoconverted ($\lambda_{exc}=800$ nm) multiple neurons in a single plane of the spinal cord (red area, FIG. 4a) with cellular precision, by using 2D CGH-TF (FIG. 4b).

In a second experiment we used 3D CGH-TF to photoconvert isolated neurons (FIG. 4c) or groups of multiple neurons in distinct axial planes (FIG. 4d). For large excitation areas (FIG. 4d), green and red fluorescence intensity profiles along the axial direction (dark grey and bright grey curves of FIG. 4d) showed selective photoconversion not achievable using 3D CGH alone (FIG. 14).

Discussion

We demonstrated an optical system that enables remote axial displacement of temporally focused holographic patterns and 3D spatiotemporally focused pattern generation. The system uses two spatial light modulators. The first SLM 2 (SLM1) is addressed with phase holograms controlling the transversal target light distribution. The second SLM 3 (SLM2), positioned after the grating for TF which is the intermediate optical element 4, and illuminated by the distinct spectral frequencies linearly dispersed by the grating, is addressed with Fresnel-lens phase functions and used to controls the target axial position. We demonstrated that this configuration enables axial displacement of single or multiple spatiotemporal focused patterns across the sample (or target) volume 5.

We achieved axial displacement of a single temporally focused holographic pattern across an axial range (±300 µm), which is about 2 times larger than the nominal accessible range, $FOE_z$ (±130 µm). For axial shifts $|\Delta z| \leq FOE_z$, spot shape and axial resolution (5-10 µm) were well conserved, while fluorescence intensity decreased of about a factor of five (consistent with the almost a factor 2 decrease of the illumination intensity, FIG. 7g). Scan ranges up to twice the theoretical $FOE_z$ were also possible, however in this limit, compensation mechanisms to correct for broadening of axial confinement (25 µm for $\Delta z=\pm 300$ µm) and intensity losses need to be considered.

For applications requiring continuous axial displacement of a single spot, higher scan speed can be achieved by replacing the second optical element 3 (SLM2) with a tunable lens. This design, however, enables generation of holographic targets only in one plane.

Alternative solutions developed in the state of the art for axial displacement of temporally focused shapes used either variable group velocity dispersion (GVD) or mechanical axial translation of the TF grating (intermediate optical element 4). Introducing variable GVD to the input laser pulse allows efficient axial displacement of the temporal focal plane of Gaussian beams. However, using GVD for axial displacing holographic beams also requires spatial filtering of the hologram to be efficient. This comes at cost of the spatial resolution and illumination intensity of the holographic pattern and only enables axial displacements of few µms. Greater scanning ranges could be achieved by combining 2D CGH with the optical design proposed by Dana and colleagues for axial scanning of a temporally focused line. The system uses on-axis-light propagation and mechanical axial translation of the TF grating. However, the large grating translation required for high magnification objectives (40x) limited the axial shift of the TF plane to less than 30 µm.

Additionally to the previous restrictions, none of these approaches would enable the generation of multiple temporally focused targets at distinct axial planes. Here, we found, the conditions to overcome this limitation. This was achieved by addressing a first SLM 2 (SLM1) with multiple vertically tiled phase holograms, each encoding for the light distribution of a single plane, and a second SLM 3 (SLM2)

with an equal number of Fresnel-lens phases, which individually control the axial position for each plane. In this way, all targets are projected at the TF plane, which is kept at a fixed position, while the second SLM imposes the spatial wavefront curvature needed to displace the plane axially.

The number of spatiotemporal focal planes that can be generated with this design is a trade-off between the number of pixels of the SLM and spatial resolution. Here, we demonstrated generation of up to four spatiotemporal focal planes. Under this condition, the spatial resolution in the vertical direction, where tiling occurs, decreases of about a factor of 2 due to the reduced size of the hologram at the objective back aperture.

The capabilities of the system for patterned photostimulation with cellular resolution were demonstrated by performing 2D and 3D in vivo 2P simultaneous Kaede photoconversion of multiple zebrafish larvae spinal cord motorneurons with a cellular resolution. The unprecedented precision in photoconversion of Kaede can be extended to track the morphology of single neurons across the entire nervous system of the zebrafish larva.

We performed efficient 2P photoconversion of Kaede expressing neurons with the 3D CGH and 3D CGH-TF and showed high specificity both in 2Ds and 3Ds. For 3D photostimulation of multiple isolated targets, 3D CGH has the advantage over 3D CGH-TF of enabling light shaping on a higher number of planes. However, 3D CGH-TF permits a better axial confinement, which is a key parameter for experimental configurations requiring illumination of spatially close multiple targets or use of large excitation area. Moreover, we have previously demonstrated that TF is particularly robust to scattering making 3D CGH-TF more suitable than 3D CGH for application in scattering media.

The same experimental design could be used in conjunction with other photo switchable proteins such as photoactivatable green fluorescent protein (PA-GFP) or Kindling fluorescent protein (KFP1) for 3D tracking of individual cells in a population of cells or in tissue for precise cell tracking during embryo development.

Combined with optogenetics or uncaging, 3D generation of spatiotemporally focused patterns will enable simultaneous control of neurons and substructures in different planes, as well as provide a flexible means to stimulate locations lying above or below the imaging plane.

Decoupling of lateral and axial wavefront shaping could also be adopted in optical designs different from the one presented here. For example, placing a second SLM at the Fourier or image plane of a fast switchable array (e.g. a digital micromirror device DMD; FIG. 5) should enable 3D encoded multisite 2P microscopy or high-speed 3D holographic light patterning.

Methods

The Optical system, schematically depicted in FIG. 1a and FIG. 11, was built around a commercial Olympus IX71 inverted microscope, modified in order to accommodate two opposite placed objectives, OBJ1 (10) and OBJ2, for excitation and collection, respectively. To this end, the condenser lens of the microscope was substituted by a dielectric mirror and an Olympus LUMPLFL60×W/IR2, NA 0.90 objective. The expanded (10×) beam of a Ti:Sapphire laser (MaiTai Deep-See, Spectra-Physics) covered the active area of a first LCOS-SLM (X10468-07, Hamamatsu Photonics; the first optical element 2 (SLM1)), which modulated the phase of the incoming beam to create a first image of the desired intensity pattern on the diffraction grating (830 l/mm, 53004ZD02-035R, Richardson Gratings; G) for TF, through the first lens 6 (L1) (f1=500 mm). 2D phase holograms were calculated using a standard GS algorithm. The first diffraction order was subsequently collimated by second lens 7 (L2) (f2=500 mm) and impinged on a second spatial light modulator (X10468-07, Hamamatsu Photonics; the second optical element 3 (SLM2)), which is imaged at the back focal plane (BFP) of the excitation objective, OBJ1 (10), via a 2:1 telescope (third lenses 9a (L3), f3=1000 mm and fourth lens 9b (L4), f4=500 mm).

Suppression of the zero-order spot arising from the first optical element 2 (SLM1) was achieved by using two cylindrical lenses ($f_{L1}$=1000 mm and $f_{L2}$=−1000 mm) oriented at +45° and −45° in respect to the grating lines.

Holographic light patterns generated at the sample volume illuminated a thin rhodamine-6G spin coated layer and the induced fluorescence was imaged on a CCD camera through a second objective (OBJ2; Olympus UPLSAPO60XW, NA 1.2) placed opposite to the excitation one. For 3D reconstruction of illumination volumes, OBJ2 was fixed and focused on the fluorescent layer, while OBJ1 (10) was moved along the axial direction with a piezo positioner of 1 mm range when working in closed loop (PI N-725.2A PIFOC®).

The two SLMs 2 and 3, the CCD camera and the piezo positioner were controlled by a custom developed interface in LabVIEW. GS based algorithms were run in MATLAB.

When the setup was used for generation of 3D holographic patterns (not temporally focused) the diffraction grating was replaced by a mirror and the second optical element 3 (SLM2) was either used in reflectance mode, by applying only the flatness correction phase mask of the device, or also replaced by a mirror. Both the grating and the second optical element 3 (SLM2) were mounted on magnetic bases permitting fast switching between the different configurations.

Two-color HiLo imaging system. High-resolution 3D fluorescence imaging of zebrafish samples was achieved by implementing an optical set up for two-color HiLo microscopy to the Olympus microscope IX71. Two continuous wave (CW) 473-nm (Laser Quantum, Ciel 350 mW) and 561-nm (CNI laser, MGL-N-561-500 mW) lasers were aligned and collimated with the dichroic mirror D2 (Semrock, Di02-R514) and lenses L6 (f6=125 mm), L7 (f7=150 mm) and L10 (f10=35 mm) to illuminate an oscillating diffuser plate (D; Optotune LSR-3005-10) that was imaged through lenses L8 (f8=75 mm) and L9 (f9=200 mm) at the back aperture of the excitation objective, OBJ1 (FIG. 13a). The D1 dichroic mirror reflected the collected fluorescence to a CMOS camera (Hamamatsu, Orca Flash 4.0-V2) through the appropriate filter cube (FC2) for green (dichroic mirror Semrock FF495-Di02, emission filter Semrock FF01-520/35-25) or red fluorescence (dichroic mirror Semrock Di02-R561, emission filter Semrock FF595-Di02).

The sectioned image was computed with MATLAB (Lauterbach et al. in preparation). The cut-off frequency used to merge the low and high-frequency components was chosen such as kc≈0.1 klow, where klow is the frequency of the low-pass filter applied to the uniform illumination image. With those parameters, we measured an axial resolution of 3.2 μm FWHM (FIG. 13c).

Photoconversion Protocol

At first, a HiLo z-stack in the green channel (200×200×100 μm$^3$) was recorder to map the location of neuronal cells for photostimulation. Based on these images, we calculated phase holograms that produced the corresponding 2D or 3D illumination patterns for photoconversion. We typically used 5-μm-diameter holographic spots to target single cells and 30-35-μm-diameter holographic spots to target sets of neurons. In order to quantify efficiency of photoconversion, we also recorded the corresponding z-stack in the red channel before photoconversion.

Two-photon photoconversion (λ=800 nm) of all targets simultaneously was performed while monitoring the fluorescence in the red channel. We typically observed a tenfold increase of red fluorescence in the targeted cells. Photoconversion during fluorescence imaging was minimized by keeping the total acquisition time below two minutes and laser power at the sample plane below 20 mW.

To minimize photodamage during photoconversion, we delivered trains of 50 ms pulses, low laser intensity ~0.04-4 mW/μm$^2$ for periods of time that ranged from 200 ms to a few hundreds seconds depending on the laser intensity.

Zebrafish Transgenic Lines

All experiments were performed on *Danio rerio* larvae between 2 and 7 days post fertilization (dpf). AB and TL strains of wild-type (WT) larvae were obtained from our laboratory stock of adults. Embryos and larvae were raised in an incubator at 28.5° C. until shortly before recordings were performed. The HuC promoter drives pan-neuronal expression of Gal4 and Kaede fluorescent protein. Tg(HuC: Gal4; UAS:Kaede) transgenic larvae were used for this study. Before recordings were performed, embryos were dechorionated and screened for fluorescence at 1 dpf. Larvae screened for Kaede fluorescence were later embedded in 1.5% agarose on the lateral side facing up. Larvae were anesthetized in 0.02% MS-222 (Sigma-Aldrich, USA).

The invention claimed is:

1. An optical system for shaping a wavefront of an electric field of a light beam (1) to be projected into a target volume (5), for realizing multi (3D)-transversal plane illumination patterns along the optical axis (z) in a target volume, including:
   (i) a first optical element (2) which is a spatial light modulator used to control light distribution, through phase or amplitude modulation of the electric field of the light beam, forming 2D illumination patterns in at least one transverse plane (51, 52, 53) in the target volume (5) in regard to an optical axis (z), a first spatial light modulator being divided in a number of first independent regions (21, 22), each of these first independent regions (21, 22) being used to generate a 2D illumination pattern (511, 521) focused onto at least one intermediate optical element (4, 4a, 4b),
   (ii) the at least one intermediate optical element (4, 4a, 4b) being a dispersive grating having lines for performing temporal focusing of the light beam (1) on the at least one transverse plane (51, 52, 53), and being located, on the optical axis (z), after the first optical element (2) on a trajectory of the light beam (1) where an image of the 2D illumination patterns is formed, for modulating the phase or the amplitude of the electric field of the light beam,
   (iii) and a second optical element (3) being a spatial light modulator for modulating the phase of the electric field of the input light beam and used to control an axial position of the at least one transverse plane (51, 52, 53) in the target volume (5) along the optical axis (z), the second optical element (3) being situated on the optical axis (z) after the at least one intermediate optical element (4) on the trajectory of the light beam (1) at a plane conjugated to the at least one intermediate optical element (4, 4a, 4b), the second optical element (3) being divided in a number of second independent regions (31, 32) equal to the number of first independent regions (21, 22), each second independent region (31, 32) controlling the axial position in the target volume (5) of the corresponding 2D illumination patterns (511, 521) generated by the first spatial light modulator in the transverse planes (51, 52), the transverse planes (51, 52) being displaced independently of each other in regard to the optical axis (z) in the target volume, the number of first independent regions (21, 22) being equivalent to the number of transverse planes (51, 52), the first independent regions and the second independent regions (21, 22, 31, 32) are tiled parallel to an orientation of the dispersive grating lines.

2. The optical system according to claim 1, wherein the optical system comprises at least two intermediate optical elements (4) and wherein:
   a first intermediate optical element (4a) is located at a Fourier plane of a first lens (6) situated between the first optical element (2) and the first intermediate optical element (4a), and
   a last intermediate optical element (4b) is located at a back focal plane of a second lens (7) situated between the last intermediate optical element (4b) and the second optical element (3), such that the second optical element (3) is located at a Fourier plane of the second lens (7).

3. The optical system according to claim 1, wherein the optical system comprises at least two intermediate optical elements (4) and wherein:
   a first intermediate optical element (4a) is located at a Fourier plane of a first lens (6) situated between the first optical element (2) and the first intermediate optical element (4a), and
   a last intermediate optical element (4b) is located at a plane that is conjugated to the plane of the first intermediate optical element through a telescope formed by two lenses (8a) and (8b).

4. The optical system according to claim 1, wherein the optical system comprises two intermediate optical elements, the first intermediate optical element being a digital micromirror device (DMD) and the second intermediate optical element being a dispersive grating.

5. The optical system according to claim 1, wherein the optical system comprises one intermediate optical element (4) and wherein the intermediate optical element (4) is located at a Fourier plane of a first lens (6) situated between the first optical element (2) and the at least one intermediate optical element (4).

6. The optical system according to claim 1, wherein the optical system comprises one single intermediate optical element, which is a digital micromirror device for fast amplitude modulation of the illumination patterns in the at least one transverse plane and wherein the first independent regions and second independent regions (21, 22, 31, 32) are tiled vertically or horizontally relatively to the planes of the optical elements (2,3).

7. The optical system according to claim 1, wherein the second optical element (3) is located at a back focal plane of a third lens (9a), which, together with a fourth lens (9b), form a telescope to image the plane of the second optical element (3) to a back focal plane of an objective lens (10).

8. The optical system according to claim 1, wherein the second optical element (3) is a phase spatial light modulator programmed to compensate for optical aberrations introduced by elements located after the last intermediate optical element on the optical axis.

9. The optical system according to claim 1, wherein the second spatial light modulator (3) is being operatively addressed with cropped spherical phase functions in each second independent region (31, 32).

\* \* \* \* \*